US008307242B2

(12) United States Patent
Arata et al.

(10) Patent No.: US 8,307,242 B2
(45) Date of Patent: Nov. 6, 2012

(54) FAILURE RECOVERY METHOD, FAILURE RECOVERY PROGRAM AND MANAGEMENT SERVER

(75) Inventors: Shigeki Arata, Yokohama (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/277,700

(22) Filed: Oct. 20, 2011

(65) Prior Publication Data
US 2012/0036393 A1 Feb. 9, 2012

Related U.S. Application Data

(63) Continuation of application No. 12/544,158, filed on Aug. 19, 2009, now Pat. No. 8,074,099.

(30) Foreign Application Priority Data

Nov. 26, 2008 (JP) .................................. 2008-300644

(51) Int. Cl.
*G06F 11/00* (2006.01)

(52) U.S. Cl. .......... 714/6.3; 714/4.11; 714/4.12; 714/13

(58) Field of Classification Search ............. 714/4.11, 714/4.12, 4.2, 6.3, 13
See application file for complete search history.

(56) References Cited

U.S. PATENT DOCUMENTS

| 6,145,089 A | 11/2000 | Le et al. |
| 6,195,760 B1 | 2/2001 | Chung et al. |
| 6,594,775 B1 | 7/2003 | Fair |
| 6,990,606 B2 | 1/2006 | Schroiff et al. |
| 7,159,234 B1 | 1/2007 | Murphy et al. |
| 7,234,073 B1 | 6/2007 | Roytman et al. |
| 7,478,149 B2 * | 1/2009 | Joshi et al. ..................... 709/223 |
| 7,549,076 B2 | 6/2009 | Hatasaki et al. |
| 7,818,615 B2 | 10/2010 | Krajewski et al. |
| 2003/0032425 A1 | 2/2003 | Kim et al. |
| 2005/0204183 A1 * | 9/2005 | Saika ............................... 714/4 |
| 2006/0117211 A1 | 6/2006 | Matsunami et al. |
| 2006/0117212 A1 | 6/2006 | Meyer et al. |
| 2006/0123386 A1 | 6/2006 | Tameshige et al. |
| 2006/0143498 A1 | 6/2006 | Hatasaki et al. |
| 2006/0174154 A1 | 8/2006 | Gous et al. |
| 2006/0200584 A1 | 9/2006 | Bhat |
| 2007/0260913 A1 | 11/2007 | Hatasaki et al. |
| 2007/0276897 A1 | 11/2007 | Tameshige et al. |
| 2008/0091746 A1 | 4/2008 | Hatasaki et al. |
| 2008/0235533 A1 | 9/2008 | Hatasaki et al. |
| 2010/0239077 A1 | 9/2010 | Michaelis et al. |

FOREIGN PATENT DOCUMENTS

| JP | 2006-163885 A | 6/2006 |
| JP | 2006-163963 A | 6/2006 |
| JP | 2007-316724 A | 12/2007 |

\* cited by examiner

Primary Examiner — Joshua P Lottich
(74) Attorney, Agent, or Firm — Foley & Lardner LLP

(57) ABSTRACT

In a computer system including server apparatuses such as an active server and a standby server connected to a storage apparatus, when the active server fails, a management server changes over connection to the storage apparatus from the active server to standby server to thereby hand over operation to the standby server. The management server refers to a fail-over strategy table in which apparatus information of the server apparatuses is associated with fail-over methods to select fail-over strategy in consideration of apparatus information of the active and standby servers.

17 Claims, 21 Drawing Sheets

FIG. 9

121 SERVER MANAGEMENT TABLE

| SERVER APPARATUS IDENTIFIER 901 | PROCESSOR CONFIGURATION INFORMATION 902 | MEMORY CAPACITY 903 | SERVER ASSIGNMENT APPARATUS IDENTIFIER 904 | CONNECTION FC-SW PORT INFORMATION 905 | I/O SWITCH CONNECTION INFORMATION 906 | SERVER CONNECTION I/O PORT INFORMATION 907 |
|---|---|---|---|---|---|---|
| HOST1 | PROCESSOR 1GHz | 2GB | HBA1 | FC-SW1 PORT0 | ABSENCE | — |
| HOST2 | PROCESSOR 1GHz | 2GB | HBA2 | FC-SW1 PORT1 | ABSENCE | — |
| HOST3 | PROCESSOR 1GHz | 2GB | HBA3 | FC-SW1 PORT2 | ABSENCE | — |
| HOST4 | PROCESSOR 2GHz×2 | 4GB | HBA4 | FC-SW1 PORT3 | PRESENCE | IO-SW1 PORT3 |
| HOST5 | PROCESSOR 2GHz×2 | 4GB | HBA5 | FC-SW1 PORT4 | PRESENCE | IO-SW1 PORT4 |

FIG. 10

122 SERVER FAIL-OVER MANAGEMENT TABLE

| SERVER APPARATUS IDENTIFIER (1001) | EXECUTION FORM INFORMATION (1002) | EXECUTION OPERATION IDENTIFIER (1003) | SERVER STATE INFORMATION (1004) |
|---|---|---|---|
| HOST1 | ACTIVE | OPERATION1 | NORMAL |
| HOST2 | ACTIVE | OPERATION2 | NORMAL |
| HOST3 | STANDBY | — | NORMAL |
| HOST4 | ACTIVE | OPERATION3 | NORMAL |
| HOST5 | ACTIVE | OPERATION3 | NORMAL |

FIG. 11

123 FAIL-OVER STRATEGY TABLE

| FAIL-OVER METHOD NAME (1101) | NECESSARY FAIL-OVER TIME (1102) | KIND OF HBA (1103) | I/O SWITCH PRESENCE/ABSENCE INFORMATION (1104) | PRIORITY DEGREE (1105) |
|---|---|---|---|---|
| DEPLOY METHOD | 60MINUTES | HBA-A | ABSENCE | 4 |
| | | HBA-B | PRESENCE | |
| MAPPING CHANGE METHOD | 15MINUTES | HBA-A | ABSENCE | 3 |
| | | | PRESENCE | |
| WWN FAIL-OVER METHOD | 25MINUTES | HBA-A | ABSENCE | 2 |
| | | HBA-B | PRESENCE | |
| ADAPTER SUCCESSION METHOD | 25MINUTES | HBA-A | PRESENCE | 1 |
| | | HBA-B | | |

FIG. 12

124 FAIL-OVER CONDITION TABLE

| EXECUTION OPERATION IDENTIFIER (1201) | NECESSARY MINIMUM PERFORMANCE (PROCESSOR) (1202) | NECESSARY MINIMUM PERFORMANCE (MEMORY) (1203) | RECOMMENDATION PERFORMANCE (PROCESSOR) (1204) | RECOMMENDATION PERFORMANCE (MEMORY) (1205) | PERMISSIBLE FAIL-OVER TIME (1206) |
|---|---|---|---|---|---|
| OPERATION1 | 1GHz | 1GB | 2GHz | 4GB | — |
| OPERATION2 | 1GHz | 1GB | 2GHz | 2GB | 20MINUTES |
| OPERATION3 | 1GHz | 2GB | 2GHz | 4GB | 15MINUTES |

FIG. 13

125 I/O SWITCH MANAGEMENT TABLE

| I/O SWITCH IDENTIFIER (1301) | I/O PORT NUMBER (1302) | CONNECTION APPARATUS INFORMATION (1303) | APPARATUS IDENTIFIER (1304) | APPARATUS STATE INFORMATION (1305) |
|---|---|---|---|---|
| IO-SW1 | 0 | HBA | HBA4 | NORMAL |
| | 1 | HBA | HBA5 | NORMAL |
| | 2 | HBA | HBA6 | NORMAL |
| | 3 | HOST | HOST4 | NORMAL |
| | 4 | HOST | HOST5 | NORMAL |
| | 5 | NON-ASSIGNED | NON-ASSIGNED | — |
| | 6 | NON-ASSIGNED | NON-ASSIGNED | — |
| | 7 | NON-ASSIGNED | NON-ASSIGNED | — |

FIG. 14

126 FC SWITCH MANAGEMENT TABLE

| FC SWITCH IDENTIFIER | FC PORT NUMBER | CONNECTION APPARATUS INFORMATION | APPARATUS IDENTIFIER | APPARATUS STATE INFORMATION |
|---|---|---|---|---|
| FC-SW1 | 0 | HBA | HBA1 | NORMAL |
| | 1 | HBA | HBA2 | NORMAL |
| | 2 | HBA | HBA3 | NORMAL |
| | 3 | HBA | HBA4 | NORMAL |
| | 4 | HBA | HBA5 | NORMAL |
| | 5 | HBA | HBA6 | NORMAL |
| | 6 | NON-ASSIGNED | NON-ASSIGNED | — |
| | 7 | NON-ASSIGNED | NON-ASSIGNED | — |
| | 8 | NON-ASSIGNED | NON-ASSIGNED | — |
| | 9 | NON-ASSIGNED | NON-ASSIGNED | — |
| | 10 | NON-ASSIGNED | NON-ASSIGNED | — |
| | 11 | NON-ASSIGNED | NON-ASSIGNED | — |
| | 12 | STORAGE | STORAGE1 | NORMAL |
| | 13 | STORAGE | STORAGE2 | NORMAL |
| | 14 | STORAGE | STORAGE3 | NORMAL |
| | 15 | STORAGE | STORAGE4 | NORMAL |

127 HBA MANAGEMENT TABLE

| SERVER ASSIGNMENT APPARATUS IDENTIFIER (1501) | KIND OF HBA (1502) | WWN (1503) | ASSIGNMENT DISK IDENTIFIER (1504) |
|---|---|---|---|
| HBA1 | HBA-A | 50. 00. 08. 70. 00. 32. 01. 10 | LU1 |
| HBA2 | HBA-B | 50. 00. 08. 70. 00. 32. 01. 14 | LU2 |
|  |  | 50. 00. 08. 70. 00. 32. 01. 16 | — |
| HBA3 | HBA-B | 50. 00. 08. 70. 00. 32. 01. 18 | — |
|  |  | 50. 00. 08. 70. 00. 32. 01. 1A | — |
| HBA4 | HBA-B | 50. 00. 08. 70. 00. 32. 01. 1C | LU3 |
|  |  | 50. 00. 08. 70. 00. 32. 01. 1E | — |
| HBA5 | HBA-B | 50. 00. 08. 70. 00. 32. 01. 20 | LU4 |
|  |  | 50. 00. 08. 70. 00. 32. 01. 22 | — |
| HBA6 | HBA-B | 50. 00. 08. 70. 00. 32. 01. 24 | — |
|  |  | 50. 00. 08. 70. 00. 32. 01. 26 | — |

FIG. 16

128 LU MANAGEMENT TABLE

| LU IDENTIFIER (1601) | PORT NUMBER (1602) | DOMAIN ID (1603) | BACKUP IMAGE NAME (1604) | DUPLICATE DISK INFORMATION (1605) |
|---|---|---|---|---|
| LU1 | 0 | 1 | backup_host1 | STORAGE1 LU11 |
| LU2 | 0 | 2 | backup_host2 | STORAGE1 LU12 |
| LU3 | 0 | 3 | backup_host3 | — |
| LU4 | 0 | 4 | — | — |
| LU11 | 0 | 5 | — | — |
| LU12 | 0 | 6 | — | — |

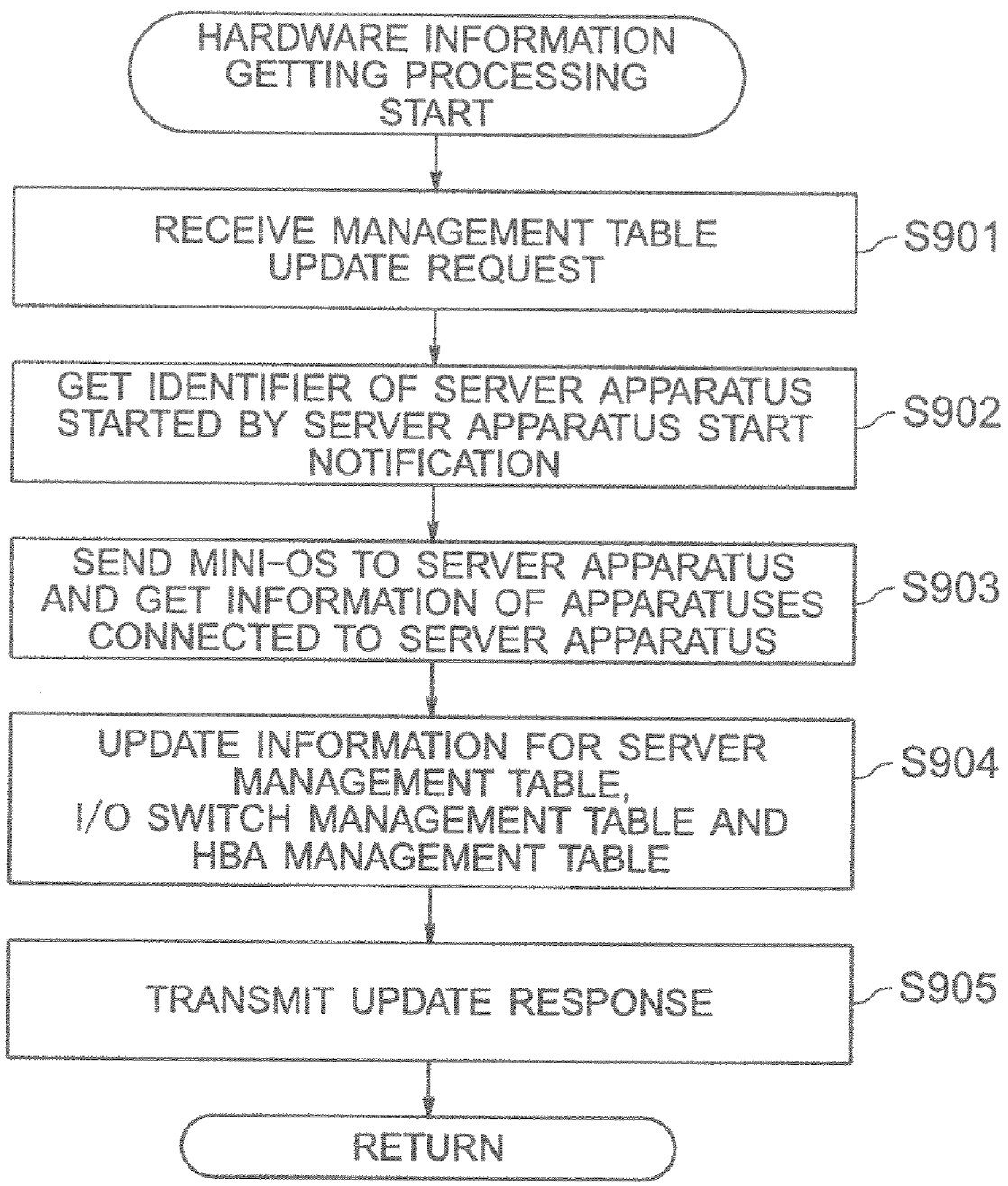

FAILURE RECOVERY METHOD, FAILURE RECOVERY PROGRAM AND MANAGEMENT SERVER

CROSS-REFERENCE TO RELATED PATENT APPLICATIONS

Japan Priority Application 2008-300644, filed Nov. 26, 2008 including the specification, drawings, claims and abstract, is incorporated herein by reference in its entirety. This application is a Continuation of U.S. application Ser. No. 12/544,158, filed Aug. 19, 2009, incorporated herein by reference in its entirety.

BACKGROUND OF THE INVENTION

The present invention relates to the technique for a failure recovery method, failure recovery program and management server.

Recently, in order to increase the reliability of a computer system and reduce an introduction cost, the computer system which includes one standby server for a plurality of active servers and in which, when the active server fails, connection of the active server to a storage apparatus is changed to the standby server so that the standby server takes over operation to make the computer system recover from the failed state is being increased.

For example, JP-A-2006-163963 discloses a fail-over method using taking-over of disk in which a boot disk of a failed active server is taken over by a standby server in the cold standby manner.

SUMMARY OF THE INVENTION

Generally, usable fail-over methods are different dependent on hardware configuration of computer systems because of problem such as restriction in hardware. In such state, an active server fails and even if the fail-over is performed using the method of making the standby server take over operation from the failed active server by taking-over of the boot disk described in JP-A-2006-163963, the fail-over can be performed only to the computer system having the same hardware configuration. That is, only one fail-over method can be set to the server apparatus having the same hardware configuration. Accordingly, the computer system in which server apparatuses having different hardware configuration are mixed requires standby servers equal in number to the fail-over methods used. Hence, there is a problem that a large number of standby servers are required and an introduction cost is increased.

Accordingly, it is an object of the present invention to be able to take over operation even between server apparatuses having different hardware configuration when the server apparatus fails.

In order to solve the above problem, according to the present invention. In a failure recovery method in a management server to manage accesses of a plurality of server apparatuses and memory devices in a storage apparatus, the plurality of server apparatuses include an active server and a standby server and the management server comprises storing in a memory unit fail-over strategy information associating apparatus information related to the server apparatuses with fail-over methods defining how to change over from the server apparatus to another server apparatus in access of the memory device in the storage apparatus, getting from the memory unit first apparatus information which is the apparatus information for a failed active server previously stored in the memory unit, getting a first fail-over method which is at least one fail-over method for the failed active server from the fail-over strategy information in the memory unit on the basis of the gotten first apparatus information, getting from the memory unit second apparatus information which is the apparatus information for the standby server previously stored in the memory unit, getting a second fail-over method which is at least one fail-over method for the standby server from the fail-over strategy information in the memory unit on the basis of the gotten second apparatus information, getting a third fail-over method which is common to the fail-over method contained in the first fail-over method and the fail-over method contained in the second fail-over method and changing over access of the storage apparatus from the failed active server to the standby server in accordance with the third fail-over method.

Other solution methods are described in embodiments.

According to the present invention, operation can be taken over even between server apparatuses having different hardware configuration when the server apparatus fails.

Other objects, features and advantages of the invention will become apparent from the following description of the embodiments of the invention taken in conjunction with the accompanying drawings.

BRIEF DESCRIPTION OF THE DRAWINGS

FIG. 9 shows an example of a server management table according to the embodiment of the present invention;

FIG. 10 shows an example of a server fail-over management table according to the embodiment of the present invention;

FIG. 11 shows an example of a fail-over strategy table according to the embodiment of the present invention;

FIG. 12 shows an example of a fail-over condition table according to the embodiment of the present invention;

FIG. 13 shows an example of an I/O switch management table according to the embodiment of the present invention;

FIG. 14 shows an example of an FC switch management table according to the embodiment of the present invention;

FIG. 15 shows an example of an HBA management table according to the embodiment of the present invention;

FIG. 16 shows an example of an LU management table according to the embodiment of the present invention;

FIG. 25 is a flow chart showing operation procedure of hardware information getting processing by a hardware information getting unit according to the embodiment of the present invention.

DESCRIPTION OF THE EMBODIMENTS

Embodiments of the present invention are now described in detail with reference to the accompanying drawings.
<<Configuration>>

Figure 1:
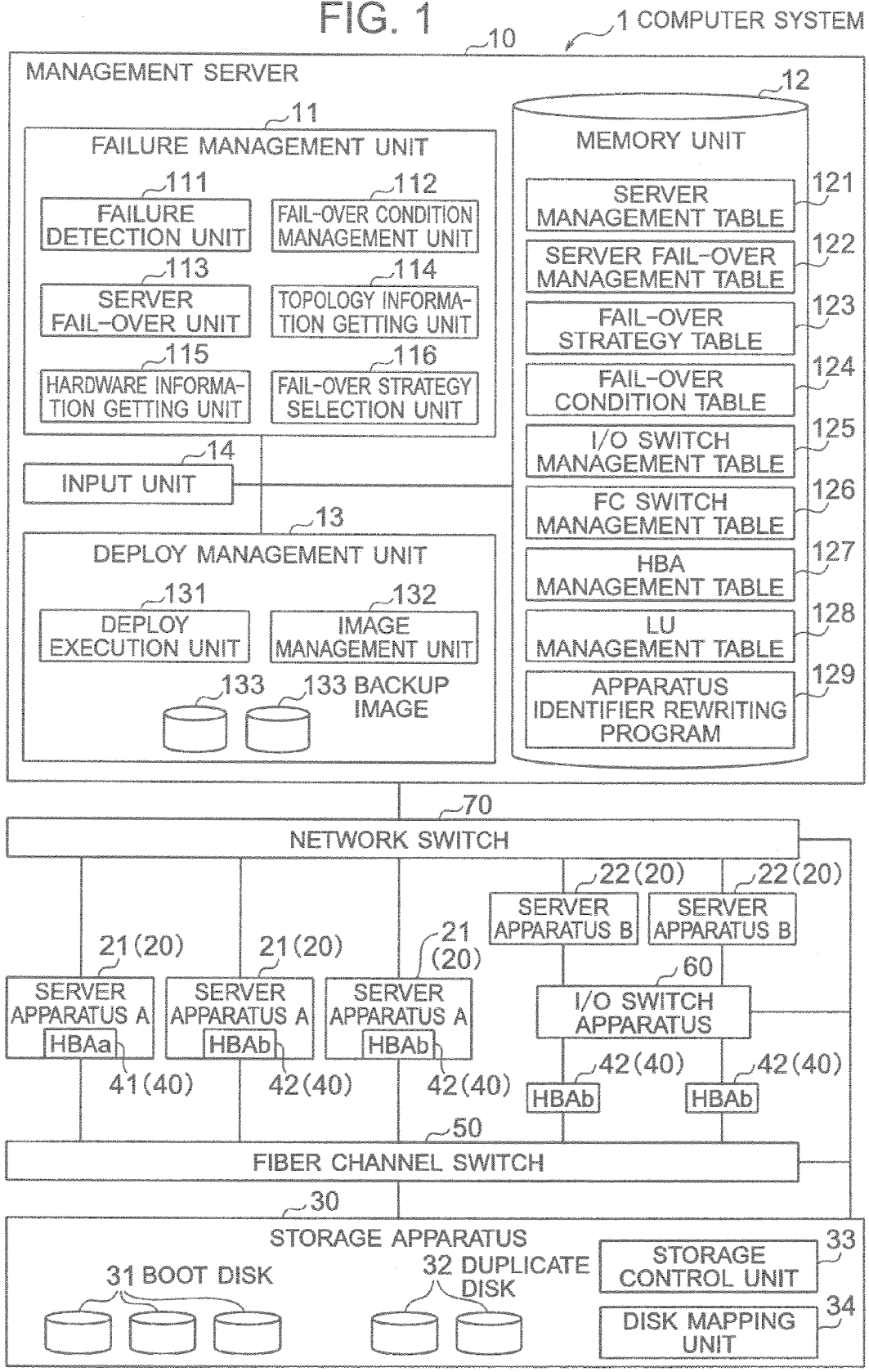
FIG. 1 is a block diagram schematically illustrating a computer system according to an embodiment of the present invention.

FIG. 1 is a block diagram schematically illustrating a computer system according to an embodiment of the present invention.

The computer system 1 includes a management server 10, server apparatuses 20 (server apparatuses A 21 and server apparatuses B 22) and a storage apparatus 30.

The management server 10 is connected to the server apparatuses 20 (server apparatuses A 21 and server apparatuses B 22) through a network switch 70 and has the function of detecting failure in the server apparatuses 20, Host Bus Adapters (HBAs) 40, an Input/Output (I/O) switch apparatus 60, a fiber channel switch 50 and the like and making the computer system recover from the failed state.

Moreover, the server apparatus A 21 includes HBA a 41 which is HBA 40 for fiber channel. The HBA a 41 is connected to the storage apparatus 30 through the fiber channel switch 50, so that the server apparatus 20 can access the storage apparatus 30.

Further, the server apparatuses B 22 are connected to HBAs b 42 through the I/O switch apparatus 60. The HBAs b 42 are connected to the storage apparatus 30 through the fiber channel switch 50, so that the server apparatuses B 22 can access the storage apparatus 30 through the I/O switch apparatus 60 and the HBAs b 42.

In other words, the server apparatuses 20 do not necessarily have the same configuration and the computer system 1 includes the server apparatuses 20 having different hardware configuration. The server apparatuses 20 are classified into active servers which perform operation processing and standby servers. The active servers and the standby servers may be plural in number.

The management server 10 includes a failure management unit 11 for performing processing for failure in the server apparatuses 20, a deploy management unit 13 for performing deploy, a memory unit 12 for storing information therein and an input unit 14 for input sing information to the management server 10.

The failure management unit 11 includes a failure detection unit 111, a fail-over condition management unit 112, a server fail-over unit 113, a topology information getting unit 114, a hardware information getting unit 115 and a fail-over strategy selection unit 116 (fail-over method selection unit).

The failure detection unit 111 has the function of detecting failure in server apparatuses A 21, server apparatuses B 22, HBAs a 41, HBAs b 42 and I/O switch apparatus 60. The fail-over condition management unit 112 has the function of deciding the standby server and the fail-over method tor performing fail-over in accordance with the performance required for operation (operation application) used upon occurrence of failure. The server fail-over unit 113 has the function of changing over connection to a logical unit (LU) of the storage apparatus 30 from the active server to the standby server when the server apparatus 20, HBA 40 or the like fails to thereby change over operation. The topology information getting unit 114 has the function of getting identifiers and port numbers of HBA 40, I/O switch apparatus 60 and fiber channel switch 50 and storage apparatus 30 connected to server apparatuses 20 and boot disks 31. The hardware information getting unit 115 has the function of getting information about kind, identifier and state of hardware connected to the server apparatus 20 when the server apparatus 20 is started. The fail-over strategy selection unit 116 has the function of, when the server apparatus 20, HBA 40 or the like fails, extracting a possible fail-over method on the basis of information concerning the failed server apparatus 20, HBA 40 connected to the standby server, I/O switch apparatus 60, fiber channel switch 50 and storage apparatus 30.

The deploy management unit 13 includes a deploy execution unit 131, an image management unit 132 and backup image disks 133.

The deploy execution unit 131 has the function of transferring data in the boot disk 31 of the storage apparatus 30 to the standby server when the server apparatus 20, HBA 40 or the like fails. The image management unit 132 has the function of examining whether the backup image disk 133 connected to the server apparatus 20 or the restored disk is present or not. The backup image disk 133 stores therein backup image of disk in the storage apparatus 30 related to the server apparatus 20.

The memory unit 12 stores therein a server management table 121, a server fail-over management table 122, a fail-over strategy table 123 (fail-over strategy information), a fail-over condition table 124 (fail-over condition information), an I/O switch management table 125, a fiber channel (FC) switch management table 126, an HBA management table 127, an LU management table 128 and an apparatus identifier rewriting program 129.

The server management table 121 stores therein configuration information of the server apparatuses 10 and information of apparatuses connected to the server apparatuses 20. The server fail-over management table 122 stores therein execution forms of the server apparatuses 20 and information of operations being executed by the server apparatuses 20. The fail-over strategy table 123 stores therein the necessary recovery time of the fail-over method and definition of kinds of HBAs 40 corresponding to the fail-over methods. The fail-over condition table 124 stores therein hardware configuration information required for operation.

The I/O switch management table 125 stores therein information of the server apparatuses 20 connected to the I/O switch apparatus 60 and the HBAs 40. The FC switch management table 126 stores therein information of HBAs 40 and storage apparatus 30 connected to the fiber channel switch 50. The HBA management table 127 stores therein kinds of HBAs 40, inherent IDs (World Wide Name (WWN)) assigned to ports of HBAs 40 and information of logical units (LU) connected to HBAs 40. The LU management table 128 stores therein information of location in which backup image of the boot disk 31 is stored and information as to whether duplicate disk 32 is present or not. The apparatus identifier rewriting program 129 is a program having the function of rewriting inherent identifiers provided in I/O apparatuses.

The tables 121 to 128 stored in the memory unit 12 are described later in detail.

The storage apparatus 30 includes a storage control unit 33, a disk mapping unit 34, boot disks 31 (storage medium) and duplicate disks 32 (storage medium).

The boot disks 31 store therein operating system (OS) used in the server apparatus 20 and operation applications for executing operations. The duplicate disks 32 are disks in which contents of the boot disks 31 are copied. The disk mapping unit 34 has the function of relating HBAs 40 connected to the server apparatuses 20 to the boot disks 31. The storage control unit 33 is connected to the server apparatuses 20 and has the function of making reading and writing to disks 321 in disk apparatus 320.

Disks such as the boot disks 31 and the duplicate disks 32 may be flash devices, for example, instead of disks.

In the embodiment, description is made to an example in which when the active server having different apparatus configuration fails, the management server 10 recovers the computer system from the failed state to a normal state by means of different recovery measures in consideration of apparatus configuration of the failed active server and the standby server.

<<Hardware Configurations>>

Referring now to FIG. 1, the hardware configuration of the apparatuses 10, 20 and 30 is described along FIGS. 2 to 5.

(Management Server)

Figure 2:
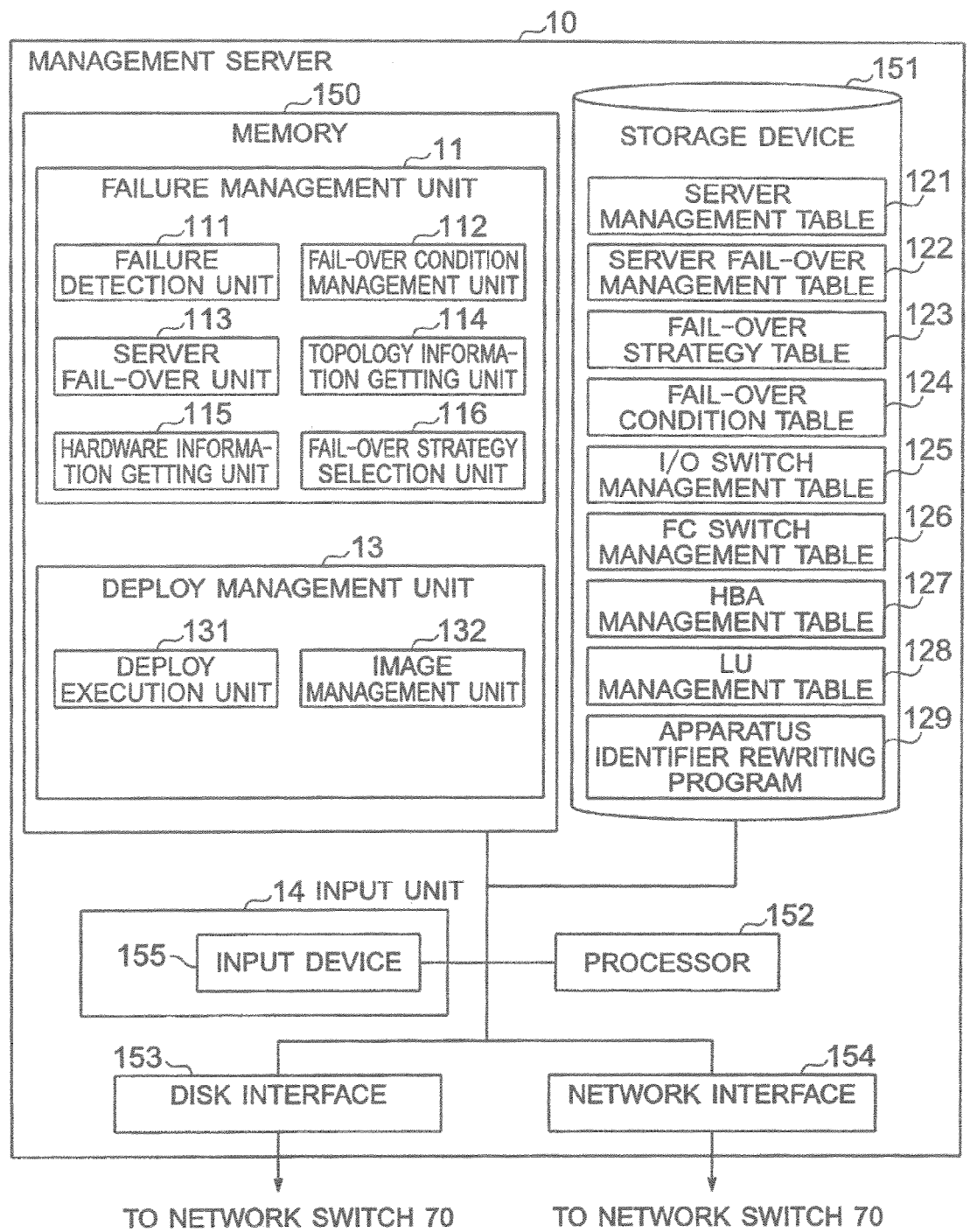
FIG. 2 is a schematic diagram illustrating an example of hardware configuration of a management server according to the embodiment of the present invention.

FIG. 2 is a schematic diagram illustrating an example of hardware configuration of the management server according to the embodiment. In FIG. 2, the same constituent elements as those of FIG. 1 are designated by the same reference numerals and description thereof is omitted.

The management server 10 includes a memory 150 such as random access memory (RAM), a storage device 151 such as read only memory (ROM) and hard disk (HD), a processor 152, a disk interface 153, a network interface 154 and an input device 155.

Programs stored in the storage device 151 are read in the memory 150 and executed by the processor 152 to thereby materialize the units 111 to 116 of the failure management unit 11 and the units 131 and 132 of the deploy management unit 13. The storage device 151 corresponding to the memory unit 12 of FIG. 1 stores therein the server management table 121, the server fail-over management table 122, the fail-over strategy table 123, the fail-over condition table 124, the I/O switch management table 125, the FC switch management table 126, the HBA management table 127, the LU management table 128 and the apparatus identifier rewriting program 129.

The disk interface 153 has the function of connecting the management server 10 through the network switch 70 to the disk of the storage apparatus 30 in which program for starting the management server 10 is stored. The network interface 154 has the function of receiving failure information of the server apparatus 20 and HBA 40 through the network switch 70. The input device 155 is a device corresponding to the input unit 14 and is constituted by keyboard and mouse.

(Server Apparatus)

Figure 3:
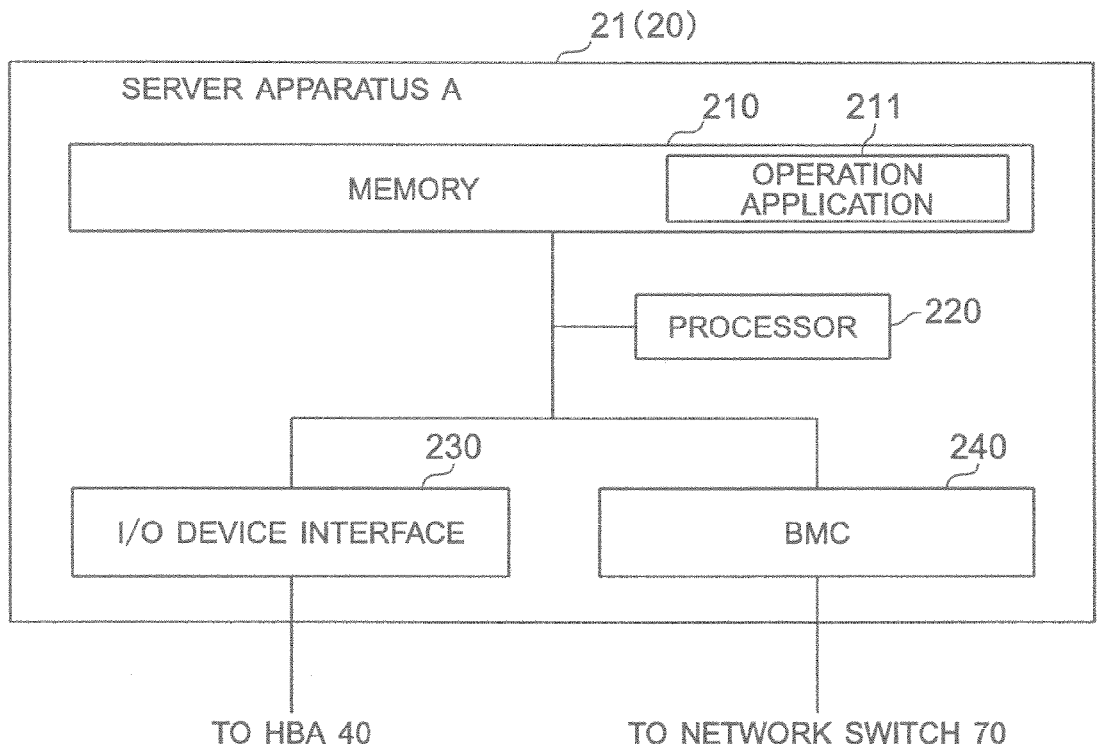
FIG. 3 is a schematic diagram illustrating an example of hardware configuration of a server apparatus A according to the embodiment of the present invention.

FIG. 3 is a schematic diagram illustrating an example of hardware configuration of the server apparatus A according to the embodiment. The server apparatus A 21 (server apparatus 20) includes a memory 210, a processor 220, an I/O device interface 230 and a base board management controller (BMC) 240.

Operation application 211 processed by the server apparatus A 21 is read in from the storage apparatus 30 to be stored in the memory 210 and executed by the processor 220. The I/O device interface 230 is connected to HBA 40. The BMC 240 has the function of notifying failure to the management server 10 through the network switch 70 when hardware of the server apparatus A 21 (server apparatus 20) fails. Since the BMC 240 can be operated independent of a failure occurrence place, the BMC 240 can transfer failure notification even when the memory 210 or the processor 220 fails.

Figure 4:
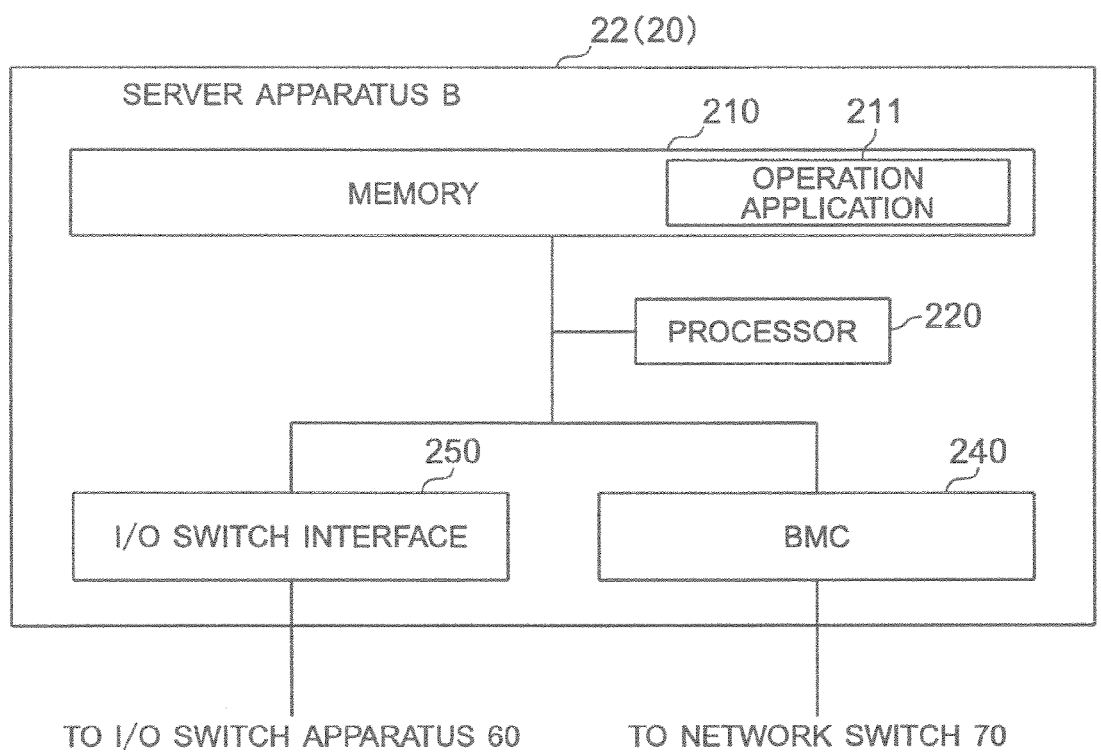
FIG. 4 is a schematic diagram illustrating an example of hardware configuration of a server apparatus B according to the embodiment of the present invention.

FIG. 4 is a schematic diagram illustrating an example of hardware configuration of the server apparatus B according to the embodiment. In FIG. 4, the same constituent elements as those of FIG. 3 are designated by the same reference numerals and description thereof is omitted.

The server apparatus B 22 (server apparatus 20) of FIG. 4 is different from the server apparatus A 21 of FIG. 3 in that an I/O switch interface 250 for connecting the server apparatus B 22 to the I/O switch apparatus 60 is provided instead of the I/O device interface 230 of the server apparatus A 21.

(Storage Apparatus)

Figure 5:
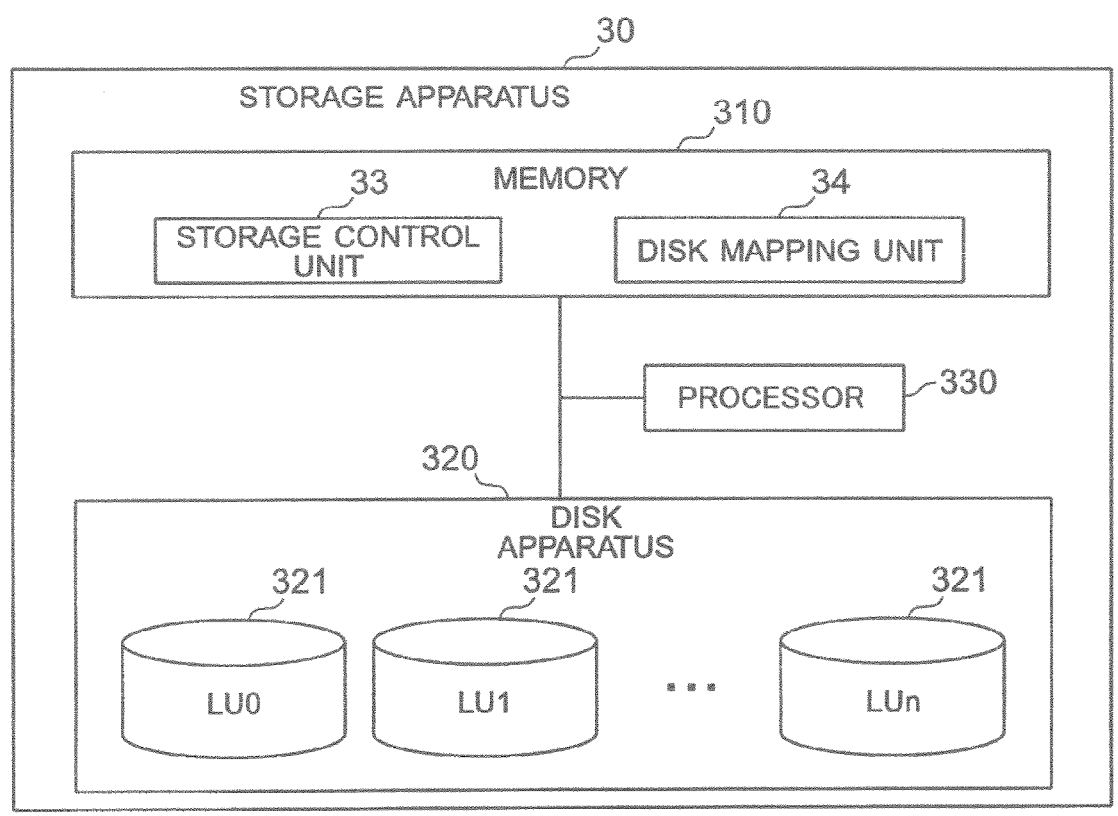
FIG. 5 is a schematic diagram illustrating of an example of hardware configuration of a storage apparatus according to the embodiment of the present invention.

FIG. 5 is a schematic diagram illustrating of an example of hardware configuration of the storage apparatus according to the embodiment.

The storage apparatus 30 includes a memory 310, disk apparatus 320 and a processor 330.

The storage control unit 33 and the disk mapping unit 34 described in FIG. 1 are stored in the memory 310 and are materialized by developing programs thereof and executing the programs by the processor 330.

Disks 321 in the disk apparatus 320 are given identifiers named logical units (LU) and can be identified by the server apparatus 20.

As described above, the desks 321 may be flash devices, for example, instead of disks.

SUMMARY OF OPERATION

Figure 6:
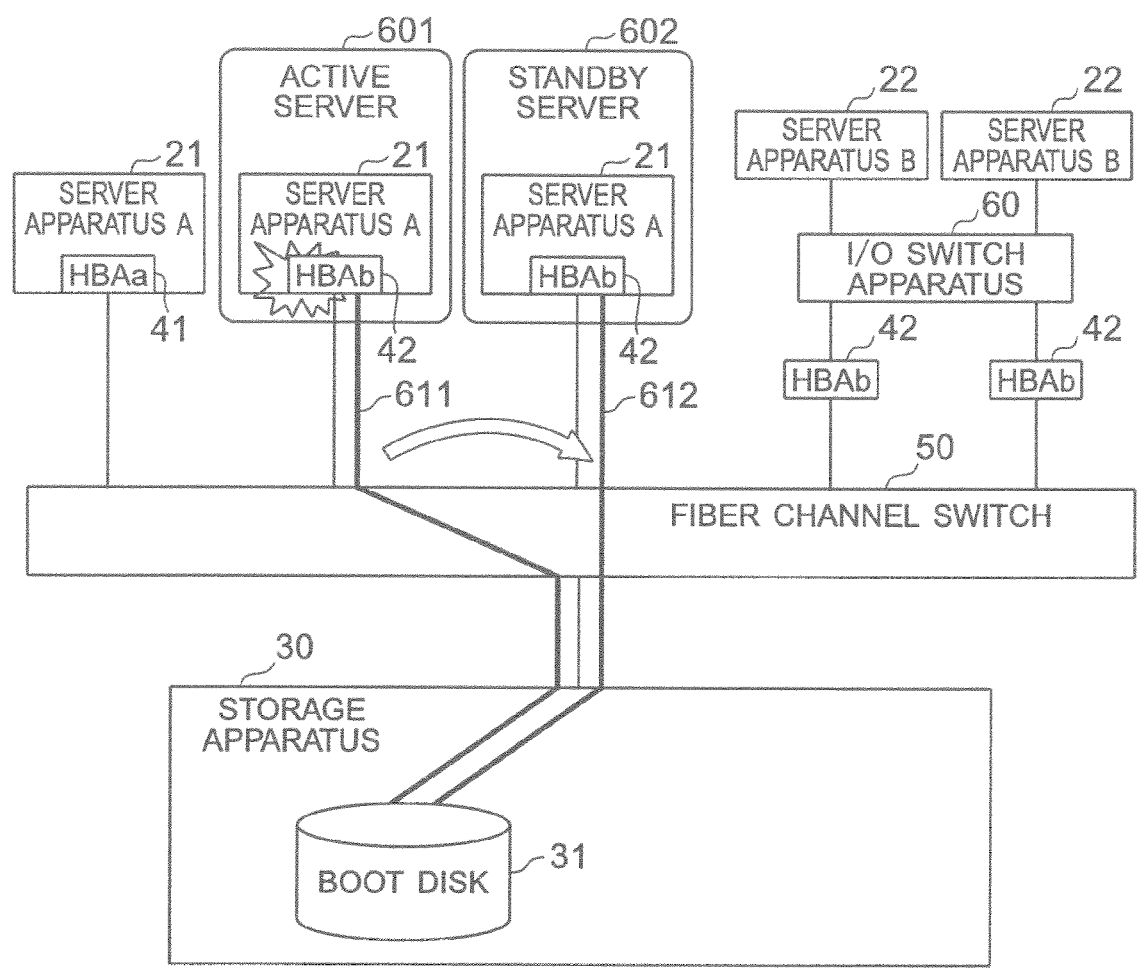
FIG. 6 is a diagram schematically illustrating an example of operation of the embodiment of the present invention (part 1)
Figure 7:
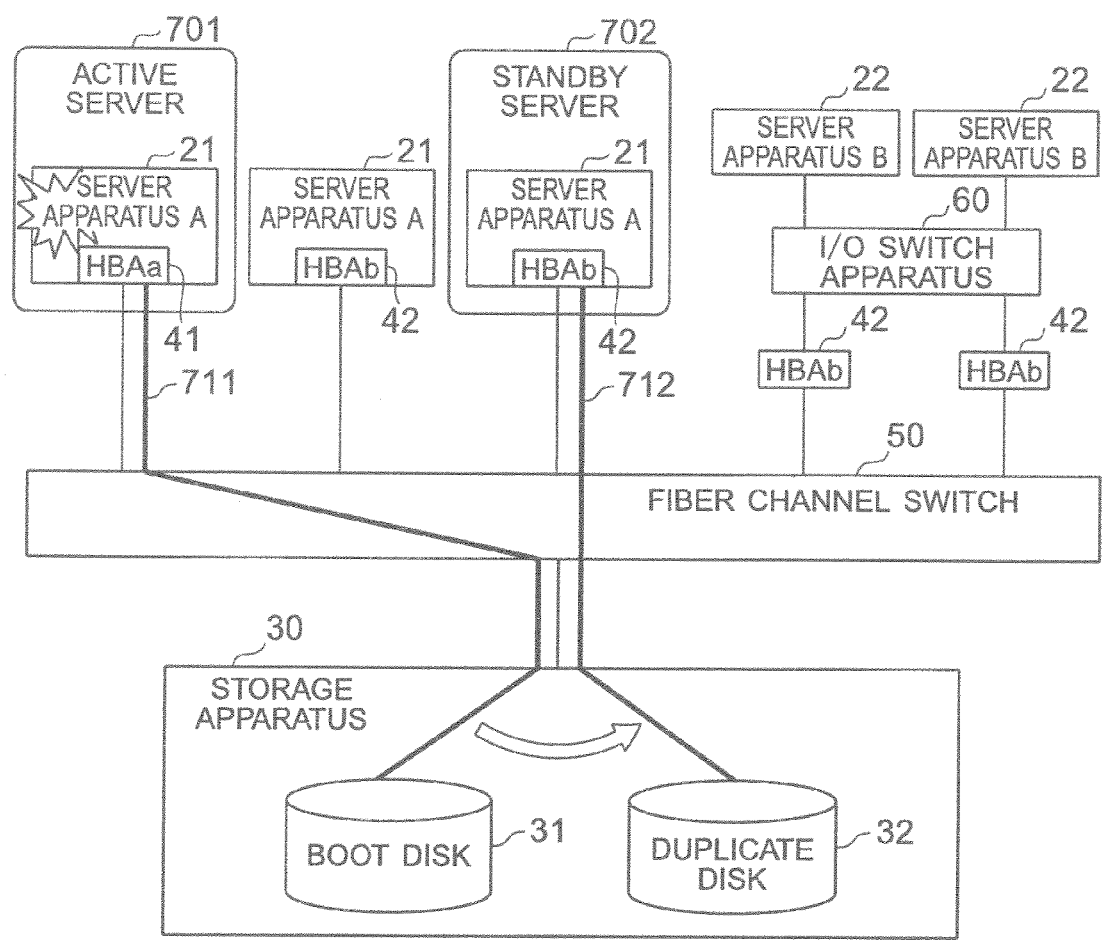
FIG. 7 is a diagram schematically illustrating an example of operation of the embodiment of the present invention (part 2)
Figure 8:
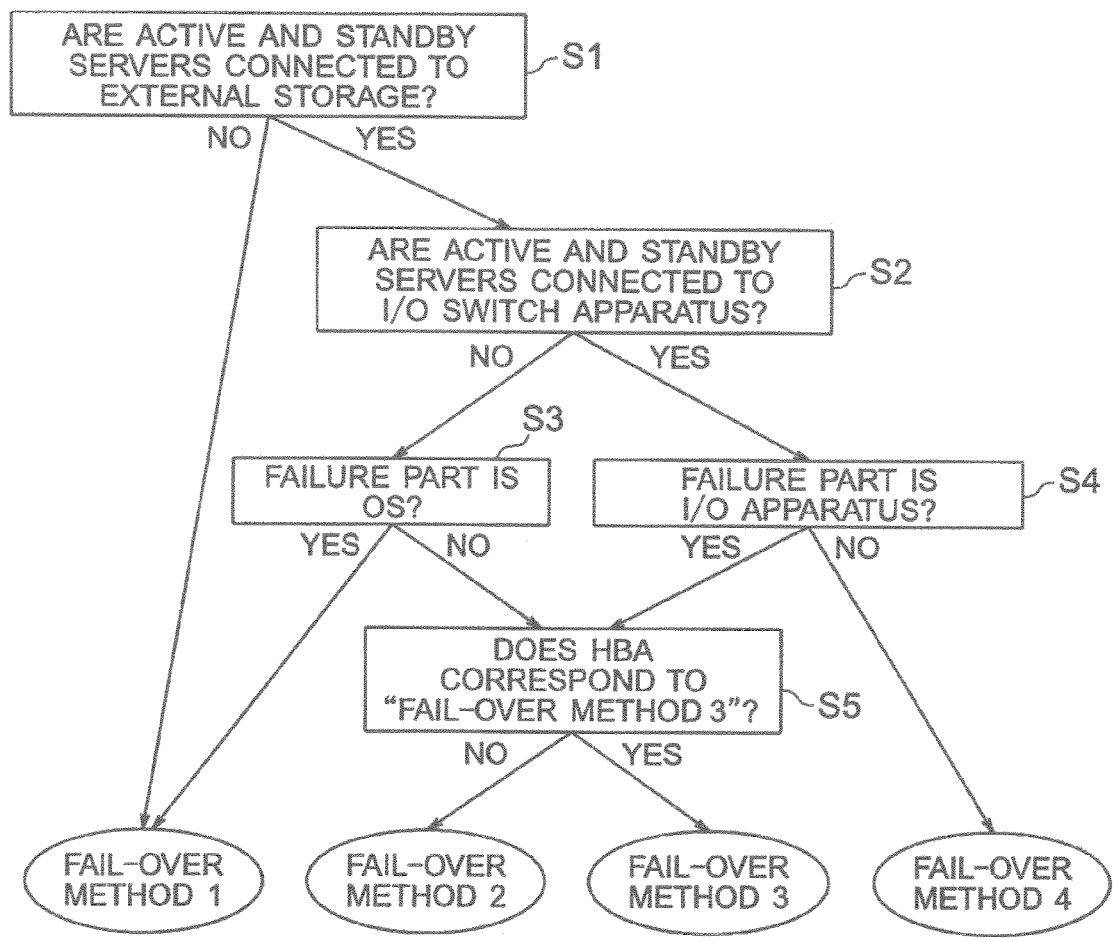
FIG. 8 is a diagram illustrating an example of fail-over strategy according to the embodiment of the present invention.

Referring now to FIGS. 6 to 8, the outline of operation of the embodiment is described.

FIGS. 6 and 7 illustrate an example of the outline of operation of the embodiment. In FIGS. 6 and 7, the same constituent elements as those of FIG. 1 are designated by the same reference numerals and operation thereof is omitted.

FIG. 6 illustrates the case where an active server 601 having the same hardware configuration as that of a standby server 602 fails. In such a case, the management server 10 (FIG. 1) changes a reference route to the boot disk 31 from the active server 601 (route 611) to the standby server 602 (route 612) to recover operation.

In the embodiment, when the active server 601 fails, operation are taken over by the standby server 602 provided previously. For example, programs and data required to start the active server 601 are stored in the boot disk 31 of the storage apparatus 30 and when the active server 601 fails, the boot disk 31 used by the active server 601 can be reassigned to the standby server 602 to transfer the processing (operation) of the active server 601 to the standby server 602, For that purpose, the management server 10 changes the route for referring to the boot disk 31. More specifically, the inherent identifier (WWN) of HBA b 42 connected to the standby server 602 is rewritten to the inherent identifier (WWN) of HBA b 42 connected to the active server 601 to thereby change from the route 611 before occurrence of failure to the route 612, so that the computer system can be recovered from the failed state.

In such a failure recovery method, the WWN used before occurrence of failure can be taken over by the standby server 602 as it is and accordingly the taking over can be made smooth without change.

FIG. 7 illustrates the case where the active server 701 connected to HBA a 41 having the kind different from that of the standby server 702 connected to HBA b 42 fails. In such a case, the management server 10 (FIG. 1) assigns the duplicate disk 32 to the standby server 702 to recover operation. That is, the management server 10 changes from a route 711 to a route 712, For example, the boot disk 31 in the storage apparatus 30 stores therein the operating system of the active server 701, data of operation application, driver for HBA 40 and the like. Moreover, the duplicate disk 32 stores therein the operating system, data of operation application and driver for HBA 40 which are identical with those stored in the boot disk 31. That is, the contents of the boot disk 31 are copied to the duplicate disk 32. Further, HBA a 41 and HBA b 42 are different but it is supposed that both of them are operated by the same driver.

When the active server 701 fails and is changed over to the server apparatus A 21 (standby server 702) connected to the HBA b 42, the duplicate disk 32 is assigned to the standby server 702, so that the standby server 702 can take over processing (operation) of the active server 701. Concretely, the duplicate disk 32 to which the contents of the boot disk 31 used by the active server 701 upon the failure are previously copied is retrieved and related to WWN of the HBA b 42 connected to the standby server 702. Thus, the management server 10 can recover the computer system from the failure of the active server 701.

In the example shown in FIG. 7, the previously prepared duplicate disk 32 is used, although it is not always necessary to prepare the duplicate desk 32. When there is no duplicate disk 32, the duplicate disk 32 may be prepared on the basis of data of the boot disk 31 upon occurrence of failure to recover the computer system from the failure.

In the embodiment, when failure occurs in the active server 601, 701 of the computer system 1 (FIG. 1) having different hardware configuration fails, the fail-over method as illustrated in FIGS. 6 and 7 is automatically selected in consideration of apparatus information of the active server 601, 701 and the standby servers 602, 702 to take over operation.

FIG. 8 illustrates an example of the fail-over strategy according to the embodiment.

The fail-over strategy means selection of the fail-over method taking the configuration of the server apparatus 20 into consideration.

The example of FIG. 8 shows the procedure for selecting the fail-over method in accordance with the kind of the connection apparatus of the failed active server and the standby server and a failure part. For example, a "fail-over method 1" is selected when the failed active server and the standby server are not connected to external storage (step S1→No). Furthermore, the "fail-over method 1" is also selected when the active server and the standby server are connected to the external storage (step S1→Yes) and are not connected to the I/O switch apparatus 60 (FIG. 1) (step S2→No) and the failure part is OS (step S3→Yes). A "fail-over method 4" is selected when both of the active server and the standby server are connected to the I/O switch apparatus 60 (step S1→Yes) and the failure part is not an I/O apparatus (step S4→No). "Fail-over methods 2 and 3" are selected when any of the above conditions is not satisfied (step S1→Yes, step S2→No and step S3→No or step S1→Yes, step S2→Yes and step S4→Yes). When HBA 40 is of the kind corresponding to the "fail-over method 3" (step S5→Yes), the "fail-over method 3" is selected and when HBA 40 does not correspond to the "fail-over method 3" (step S5→No), the "fail-over method 2" is selected.

For example, the "fail-over method 2" corresponds to the fail-over method" of FIG. 6 and the "fail-over method 3" corresponds to the fail-over method of FIG. 7.

The conditions for selecting the fail-over method contain information of the apparatus connected to the fiber channel switch 50, information of the apparatus connected to the I/O switch apparatus 60, hardware performance conditions required for execution of operation by user, and comparison of the kind of the apparatus connected to the active server with the kind of the apparatus connected to the standby server in addition to the conditions illustrated in FIG. 8.

<<Table>>

Referring now to FIG. 1, the tables 121 to 128 stored in the memory unit 12 are described in detail along FIGS. 9 to 16.

(Server Management Table)

FIG. 9 shows an example of the server management table according to the embodiment.

Column 901 stores therein server apparatus identifier. The server apparatus identifier is assigned to each of the server apparatuses 20. Column 902 stores therein processor configuration information of the server apparatuses 20. The processor configuration information contains processor name, clock frequency and the like. Column 903 stores therein memory capacity. Column 904 stores therein identifier of HBA 40 connected to the relevant server apparatus 20 (server assignment apparatus identifier). When the hard disk included in the server apparatus 20 is used or when HBA 40 is not connected, anything is not stored in column 904. The server assignment application identifier is not limited to the identifier of HBA 40 and may be identifier of another apparatus. Column 905 stores therein connection FC-SW (fiber channel-Switch) port information. The connection FC-SW port information contains identifier of the fiber channel switch 50 connected to HBA 40 in column 904 and port number of the fiber channel switch 50. Column 906 stores therein I/O switch connection information for the relevant server apparatus 20. For example, when the relevant server apparatus 20 is connected to the I/O switch apparatus 60, "presence" is stored as the I/O switch connection information and when it is not connected, "absence" is stored. Column 907 stores therein server connection I/O port information containing identifier of the I/O switch apparatus 60 to which the relevant server apparatus 20 is connected and port number in the server apparatus 20 of the I/O switch apparatus 60. For the server apparatus 20 having "absence" in column 906, anything is not stored in column 907.

The server management table can be used to manage apparatuses such as HBA 40, fiber channel switch 50 and I/O switch apparatus 60 assigned to the server apparatus 20.

(Server Fail-Over Management Table)

FIG. 10 shows an example of the server fail-over management table according to the embodiment.

Column 1001 stores therein the same information as the server apparatus identifier (column 901) in the server management table 121 of FIG. 9. Column 1002 stores therein execution form information indicating whether the server apparatus 20 is the active server for processing operation or the standby server for fail-over. For the active server, "active" is stored in column 1002 and for the standby server, "standby" is stored in column 1002. Column 1003 stores therein execution operation identifier which is identifier for operation which the relevant server apparatus 20 is executing currently. The execution operation identifier is assigned to each operation and for the standby server which does not execute operation, nothing is stored in column 1003. Column 1004 stores therein server state information of the relevant server apparatus 20. For example, when the relevant server apparatus is operated normally, "normal" is stored in column 1004 and when the server apparatus 20 fails, "failure" is stored in column 1004. When operation is changed over to the standby server after occurrence of failure, "being changed over" is stored therein as server state information of the relevant standby server.

The server fail-over management cable 122 can define the server for fail-over (standby server) in case where the server apparatus 20 fails. Moreover, the execution operation identifier can be described to thereby change the standby server for performing fail-over in accordance with operation being executed.

(Fail-Over Strategy Table)

FIG. 11 shows an example of the fail-over strategy table according to the embodiment.

Column 1101 stores therein fail-over method name. The fail-over method represents a kind of the fail-over method defining how the server apparatus 20 is changed over to the standby server when the server apparatus 20 fails. For example, backup and restoring of the disk connected to the failed server apparatus 20 upon the failure are performed, the deploy method is used and when WWN of the HBA 40 connected to the standby server is rewritten by WWN of the failed server apparatus 20, the WWN fail-over method is used. Column 1102 stores therein necessary fail-over time taken from occurrence to recovery of failure when the relevant fail-over method is performed. Column 1103 stores therein a kind of HBA 40 which can use the relevant fail-over method. Column 1104 stores therein I/O switch presence/absence information indicating whether the fail-over method of Column 1101 can be used or not depending on the presence/absence of the I/O switch apparatus 60. For example, when a kind of HBA 40 connected to the failed server apparatus 20 is HBA-B, the disk mapping method cannot be used. Furthermore, when the I/O switch apparatus 60 is not provided in the failed server apparatus 20, an adapter succession method cannot be used. Column 1105 stores therein the priority degree among the fail-over methods. In the example shown in FIG. 11, the smaller the priority degree is, the higher the priority order is and the larger the priority degree is, the lower the priority order is. For example, in the deploy method and the mapping change method, the mapping change method having the smaller priority degree takes priority over the deploy method.

The management server 10 can automatically extract the fail-over method useable upon occurrence of failure and select it in accordance with the fail-over strategy table 123.

(Fail-Over Condition Table)

FIG. 12 shows an example of the fail-over condition table according to the embodiment.

Column 1201 stores therein execution operation identifier which is an identifier of operation being currently executed by the server apparatus 20. Column 1202 stores therein necessary minimum performance (processor) which is the minimum performance of the processor required by the relevant operation. Column 1203 stores therein necessary minimum performance (memory) which is the minimum performance of the memory required by the relevant operation. Column 1204 stores therein recommendation performance (processor) of the processor recommended when operation is executed. Column 1205 snores therein recommendation performance (memory) of the memory recommended when relevant operation is executed. Column 1206 stores therein the fail-over time permissible in execution taken from occurrence to recovery of failure when the server apparatus 20 executing operation fails. Columns 1202 to 1206 do not store therein anything specifically when there is no limitation. Columns 1202 and 1204 store therein clock frequency as the performance of the processor and columns 1203 and 1205 store therein memory capacity as the performance of the memory.

The standby server for fail-over can be selected on the basis of the performance of the server apparatus 20 required for operation of the failed active server in accordance with the fail-over condition table 124.

(I/O Switch Management Table)

FIG. 13 shows an example of the I/O switch management table according to the embodiment.

Column 1301 stores therein I/O switch identifier assigned to each I/O switch apparatus 60. Column 1302 stores therein I/O port number of I/O switch apparatus 60. Column 1303 stores therein connection apparatus information indicating the kind of the apparatus connected to the port in column 1302. Column 1304 stores therein apparatus identifier assigned to each apparatus in column 1303. For example, when the server apparatus 20 is connected, the server apparatus identifier stored in column 901 of the server management table 121 is stored in column 1304 and when the connection apparatus information in column 1303 is "HBA", the server assignment apparatus identifier in column 1501 of the HBA management table 127 (described later with reference to FIG. 15) is stored in column 1304. In column 1303, when the connection apparatus information is "non-assigned", "non-assigned" is also stored in column 1304. Column 1305 stores therein apparatus state information indicating the state of the apparatus connected to the I/O switch apparatus 60. For example, when the apparatus can be operated normally, "normal" is stored in column 1305 and when the apparatus fails, "failure" is stored in column 1305. When any apparatus is not connected (non-assigned), anything is not stored in column 1305.

The information in the I/O switch management table 125 is updated when HBA 40 is changed, for example, when HBA 40 is newly connected and when HBA 40 is exchanged due to failure. The provision of the I/O switch management table 125 can manage the server apparatus and HBA 40 connected to the I/O switch 60.

(FC Switch Management Table)

FIG. 14 shows an example of the FC switch management table according to the embodiment.

Column 1401 stores therein FC switch identifier assigned each fiber channel switch 50 (FC switch). Column 1402 stores therein FC port number of the fiber channel switch 50. Column 1403 stores therein connection apparatus information indicating the kind of the apparatus connected to the port in column 1402. Column 1404 stores therein apparatus identifier assigned to each apparatus in column 1403. For example, when "HBA" is stored in column 1403, the server assignment apparatus identifier in column 904 of the server management table 121 is stored in column 1404 and when "storage" is stored in column 1403, the identifier assigned to each storage apparatus 30 is stored in column 1404. When the connection apparatus information in column 1403 is "non-assigned", "non-assigned" is stored in column 1404. Column 1405 stores therein apparatus state information indicating the state of the apparatus assigned to the relevant port. For example, when the apparatus is operated normally, "normal" is stored in column 1405 and when the apparatus fails, "failure" is stored in column 1405. When the apparatus is not connected (non-assigned), anything is not stored in column 1405.

Information of the FC switch management table 126 is updated when the connection apparatus is changed, for example, when HBA 40 is newly connected to the fiber channel switch 50. The provision of the FC switch management table 126 can manage the apparatuses connected to the fiber channel switch 50.

(HBA Management Table)

FIG. 15 shows an example of the HBA management table according to the embodiment.

Column 1501 stores therein server assignment apparatus identifier which is identifier of HBA 40 connected to the server apparatus 20. Information of column 1501 corresponds to information of column 904 (server assignment apparatus identifier) of FIG. 9. Column 1502 stores therein kind of HBA which is information of the kind of relevant HBA 40. Column 1503 stores therein WWN which is identifier inherent in port included in relevant HBA 40. That is, when two WWNs are assigned to one HBA 40, the HBA 40 has two ports and two WWNs are assigned to the two ports. Column 1504 stores therein assignment disk identifier which is identifier of LU related to relevant WWN. When any LU is not related to the WWN, anything is not stored in column 1504.

The provision of the HBA management table 127 can manage LUs used by the server apparatus 20. Moreover, even when HBA 40 fails and it is impossible to access the HBA 40, WWN can be gotten.

(LU Management Table)

FIG. 16 shows an example of the LU management table according to the embodiment.

Column 1601 stores therein LU identifier assigned to each LU. Information stored in column 1601 corresponds to information stored in column 1504 (assignment disk identifier) of FIG. 15. Column 1602 stores therein port number of storage apparatus 30 capable of communicating with relevant LU. Column 1603 stores therein domain ID of host group related to relevant LU. Column 1604 stores therein backup image name which is a storage destination file name of a storage location of backup image of relevant LU. In FIG. 16, backup image file name is stored in column 1604 as the backup image name, although backup image file name and absolute path of file, for example, may be stored therein. Furthermore, when there is no backup image, anything is not stored in column 1604. Column 1605 stores therein duplicate disk information which is information containing identifier of storage apparatus 30 in which duplicate disk 32 is stored and LU identifier of duplication destination to which duplicate disk is to be stored when contents of disk of relevant LU are copied. Furthermore, when disk is not copied, anything is not stored in column 1605.

The LU management table 128 is updated when the deploy management unit 13 performs backup or restoring. It is updated not only when backup or restoring is performed automatically upon occurrence of failure but also when backup or restoring is performed manually by the user. When fail-over is performed by the deploy method upon occurrence of failure in accordance with the LP management table 128, backup and restoring can be omitted to shorten the failure recovery time.

<<Flow Chart>>

Referring now to FIGS. 1 and 9 to 15, operation procedure of the failure recovery method according to the embodiment is described along FIGS. 17 to 25.

(General Sequence Chart)

Figure 17:
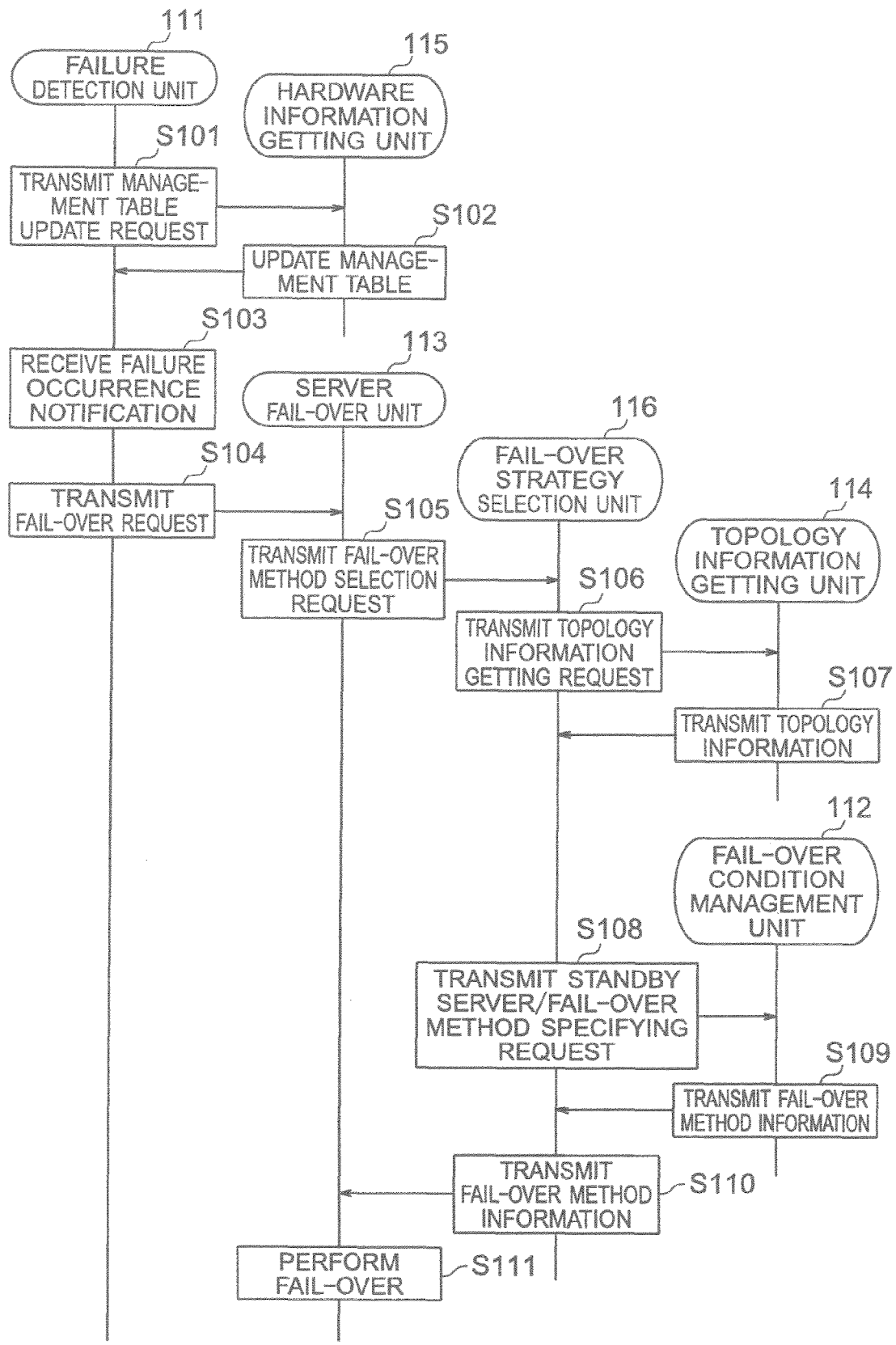
FIG. 17 is an operation sequence chart showing the whole processing according to the embodiment of the present invention.

FIG. 17 is an operation sequence chart showing the whole processing according to the embodiment.

The sequence chart of FIG. 17 shows transition of processing of the failure detection unit 111, the server fail-over unit 113, the fail-over strategy selection unit 116, the topology information getting unit 114, the fail-over condition management unit 112 and the hardware information getting unit 115. Moreover, detailed operation procedures of the units 111 to 116 are described later with reference to FIGS. 18 to 25.

First, the failure detection unit transmits a management table update request to the hardware information getting unit 115 (step S101). The management table contains the server management table 121 (FIG. 9), the server fail-over management table 122 (FIG. 10), the I/O switch management table 125 (FIG. 13), the FC switch management table 126 (FIG. 14), the HBA management table 127 (FIG. 15) and the LU management table 128 (FIG. 16). The management table update request is transmitted, for example, when the server apparatus 20 is added newly or when one of the server apparatuses 20 is started.

The hardware information getting unit 115 which has received the management table update request gets apparatus information of every kind to update the management table (step S102) and returns update end notification to the failure detection unit 111. When the failure detection unit receives failure occurrence notification from the server apparatus 20 (step S103) and receives failure occurrence information of the server apparatus 20, the failure detection unit 111 transmits a fail-over request of the server apparatus 20 to the server fail-over unit 113 (step S104). Detection of failure is performed by BMC 240 (FIGS. 3 and 4) included in the server apparatus 20 or agent program being executed in the server apparatus 20 and information containing the server apparatus identifier of the server apparatus itself is notified to the failure detection unit of the management server 10.

The server fail-over unit 113 which has received the fail-over request transmits a fail-over method selection request for selecting the fail-over method and the standby server for performing the fail-over method to the fail-over strategy selection unit 116 (step S105). The fail-over strategy selection unit 116 which has received the fail-over strategy selection request transmits topology information getting request to the topology information getting unit 114 (step S106). The topology information is information indicating connection relation in the computer system 1 and the topology information getting unit 114 gets the topology information from server management table 121, I/O switch management table 125, FC switch management table 126 and HBA management table 127.

When the topology information getting unit 114 gets the topology information, the topology information getting unit 114 transmits the topology information to the fail-over strategy selection unit 116 (step S107).

The fail-over strategy selection unit 116 selects the fail-over method and the standby server on the basis of the transmitted topology information. As a result of the selection, when any one of fail-over method and standby server is selected plural in number, the fail-over strategy selection unit 116 transmits a standby server/fail-over method specifying request for requesting to specify the fail-over method and the standby server for performing the fail-over method to the fail-over condition management unit 112 (step S108).

The fail-over condition management unit 112 which has received the standby server/fail-over method specifying request specifies one standby server and one fail-over method using the server management table 121, the server fail-over management table 122, the fail-over strategy table 123 and the fail-over condition table 124 and transmits fail-over method information containing information of specified standby server and fail-over method to the fail-over strategy selection unit 116 (step S109). Moreover, when the fail-over strategy selection unit 116 selects only one fail-over method, and only one standby server, processing in steps S108 and S109 is not performed.

The fail-over strategy selection unit 116 transmits fail-over method information containing the selected standby server and fail-over method to the server fail-over unit 113 (step S110) and the server fail-over unit 113 performs the processing for handing over operation to the standby server in accordance with the transmitted fail-over method information (step S111).

(Trouble Detection Processing)

Figure 18:
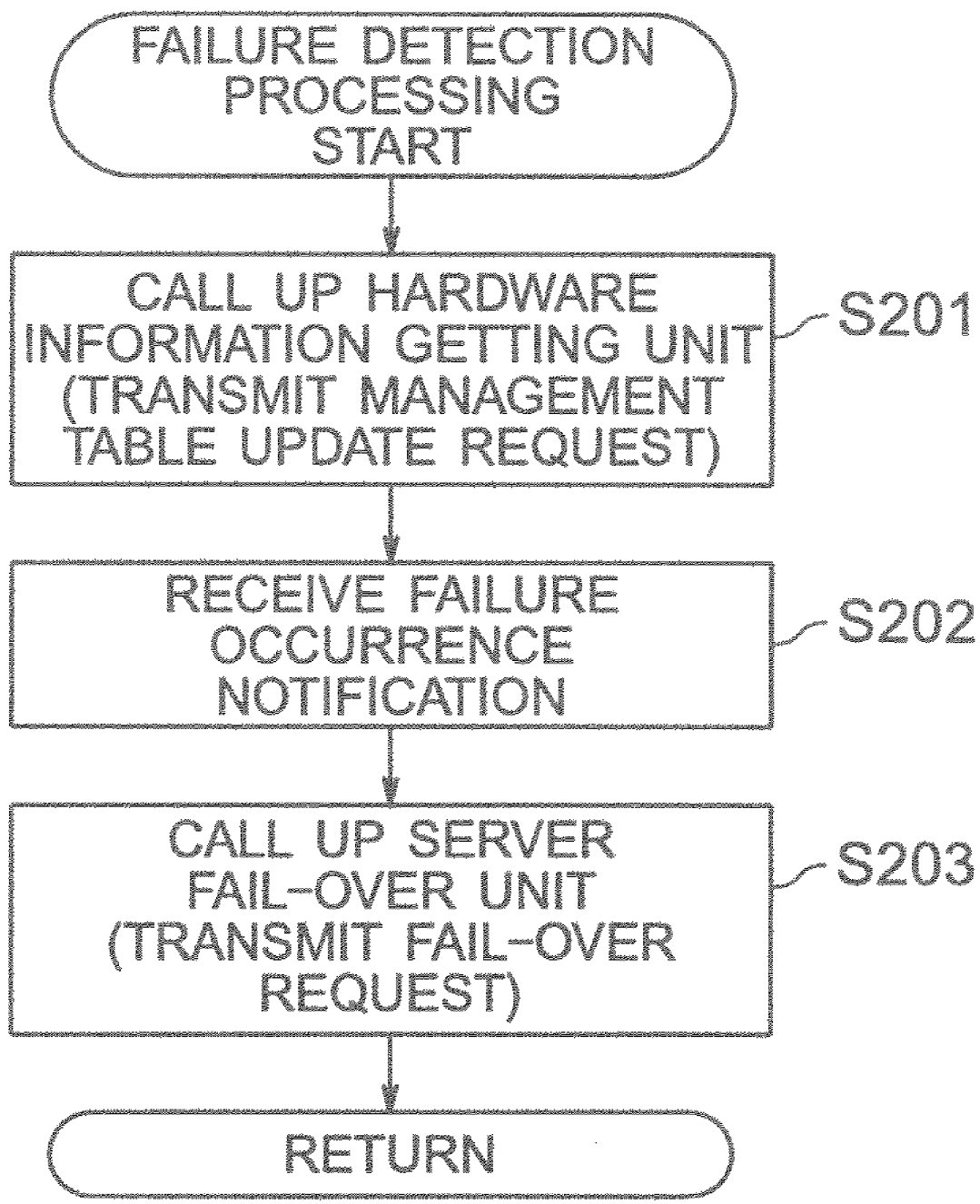
FIG. 18 is a flow chart showing operation procedure of failure detection processing by a failure detection unit according to the embodiment of the present invention.

FIG. 18 is a flow chart showing operation procedure of the failure detection processing by the failure detection unit according to the embodiment. The processing of FIG. 18 corresponds to processing of steps S101, S103 and S104 of FIG. 17.

First, as described above, the failure detection unit 111 transmits the management table update request to the hardware information getting unit 115, for example, when the server apparatus 20 is added newly or at the timing that one of the server apparatuses 20 is started, so that the hardware information getting unit 115 is called up (step S201).

When the failure detection unit 111 receives the failure occurrence notification by BMC 240 (FIGS. 3 and 4) included in the server apparatus 20 or by agent program being executed in the server apparatus 20 (step S202), the failure detection unit 111 transmits the fail-over request to the server fail-over unit 113 to call up the server fail-over unit 113 (step S203). The failure occurrence notification and the fail-over request contain the server apparatus identifier of the failed server apparatus 20 (active server).

(Server Fail-Over Processing)

Figure 19:
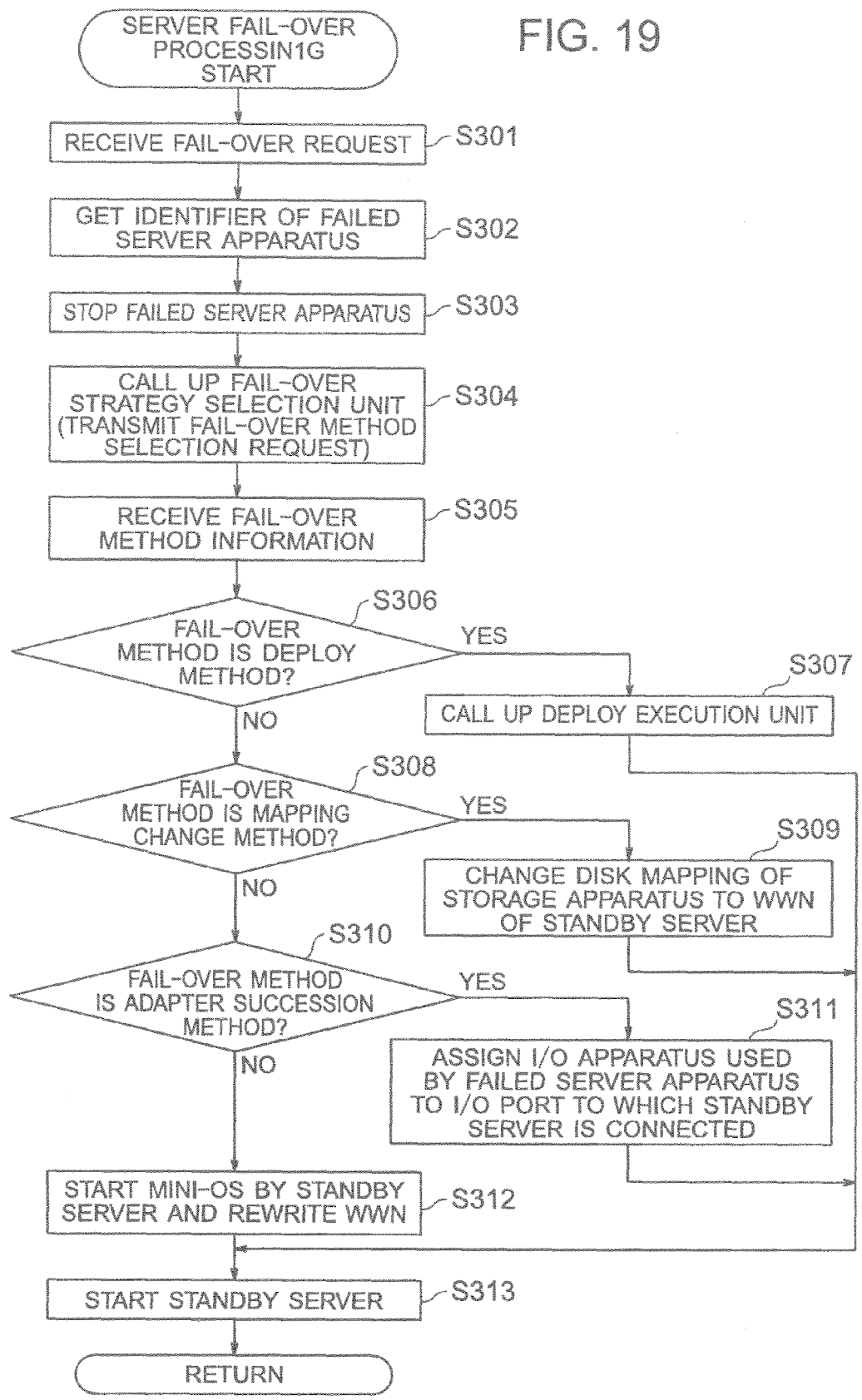
FIG. 19 is a flow chart showing operation procedure of server fail-over processing by a server fail-over unit according to the embodiment of the present invention.

FIG. 19 is a flow chart showing operation procedure of the server fail-over processing by the server fail-over unit according to the embodiment.

First, the server fail-over unit 113 receives the fail-over request transmitted by the failure detection unit 111 in step S104 of FIG. 17 (step S301). As described above, the fail-over request contains the server apparatus identifier of the failed server apparatus 20.

Next, the server fail-over unit 113 gets the identifier of the failed server apparatus 20 from the fail-over request (step S302).

The server fail-over unit 113 stops the failed server apparatus 20 (step S303).

Then, the server fail-over unit 113 transmits the fail-over method selection request to the fail-over strategy selection unit 116 to thereby call up the fail-over strategy selection unit 116 (step S304). This processing corresponds to processing in step S105 of FIG. 17. The processing of step S304 is to get the fail-over method 1101 and the server apparatus identifier of the standby server for performing the fail-over method.

Next, the server fail-over unit 113 receives the fail-over method information transmitted from the fail-over strategy selection unit 116 in step S110 of FIG. 17 (step S305). The fail-over method information contains the selected fail-over method and server identifier of the standby server for performing the fail-over method.

Next, the server fail-over unit 113 judges whether the fail-over method contained in the fail-over method information is the deploy method or not (step S306).

As a result of the step S306, when the fail-over method is the deploy method (step S306→Yes), the server fail-over unit 113 calls up the deploy execution unit 131 (step S307) and then the server fail-over unit 113 shifts the processing to S313.

As a result of the step S306, when the fail-over method is not the deploy method (step S306→No), the server fail-over unit 113 judges whether the fail-over method contained in the fail-over method information is the mapping change method or not (step S308).

As a result of step S308, when the fail-over method is the mapping change method (step S308→Yes), the server fail-over unit 113 changes the disk mapping of the storage apparatus 30 to WWN related to HBA 40 connected to the standby server (step S309) and changes over LU of the failed server apparatus 20 to the standby server. Then, the server fail-over unit 113 shifts the processing to step S313.

As a result of step S308, when the fail-over method is not the mapping change method (step S308→No), the server fail-over unit 113 judges whether the fail-over method 1101 contained in the fail-over method information is the adapter succession method or not (step S310).

As a result of step S310, when the fail-over method is the adapter succession method (step S310→Yes), the server fail-over unit 113 assigns HBA 40 (I/O apparatus) used by the failed server apparatus 20 to port (I/O port) of the I/O switch apparatus 60 to which the standby server is connected (step S311) and then the server fail-over unit 113 shifts the processing to step S313.

As a result of step S310, when the fail-over method is not the adapter succession method (step S310→No), the server fail-over unit 113 starts mini-OS by the standby server and performs the WWN fail-over method of rewriting WWN of HBA 40 connected to the standby server by WWN of the failed server apparatus 20 (step S312).

The server fail-over unit 113 starts the standby server (S313).

According to the operation procedure shown in FIG. 19, when the server apparatus 20 (active server) fails, the boot disk 31 used by the failed server apparatus 20 can be handed over to the standby server on the basis of the fail-over method 1101 selected by the fail-over strategy selection unit 116.

(Fail-Over Strategy Selection Processing)

Figure 20:
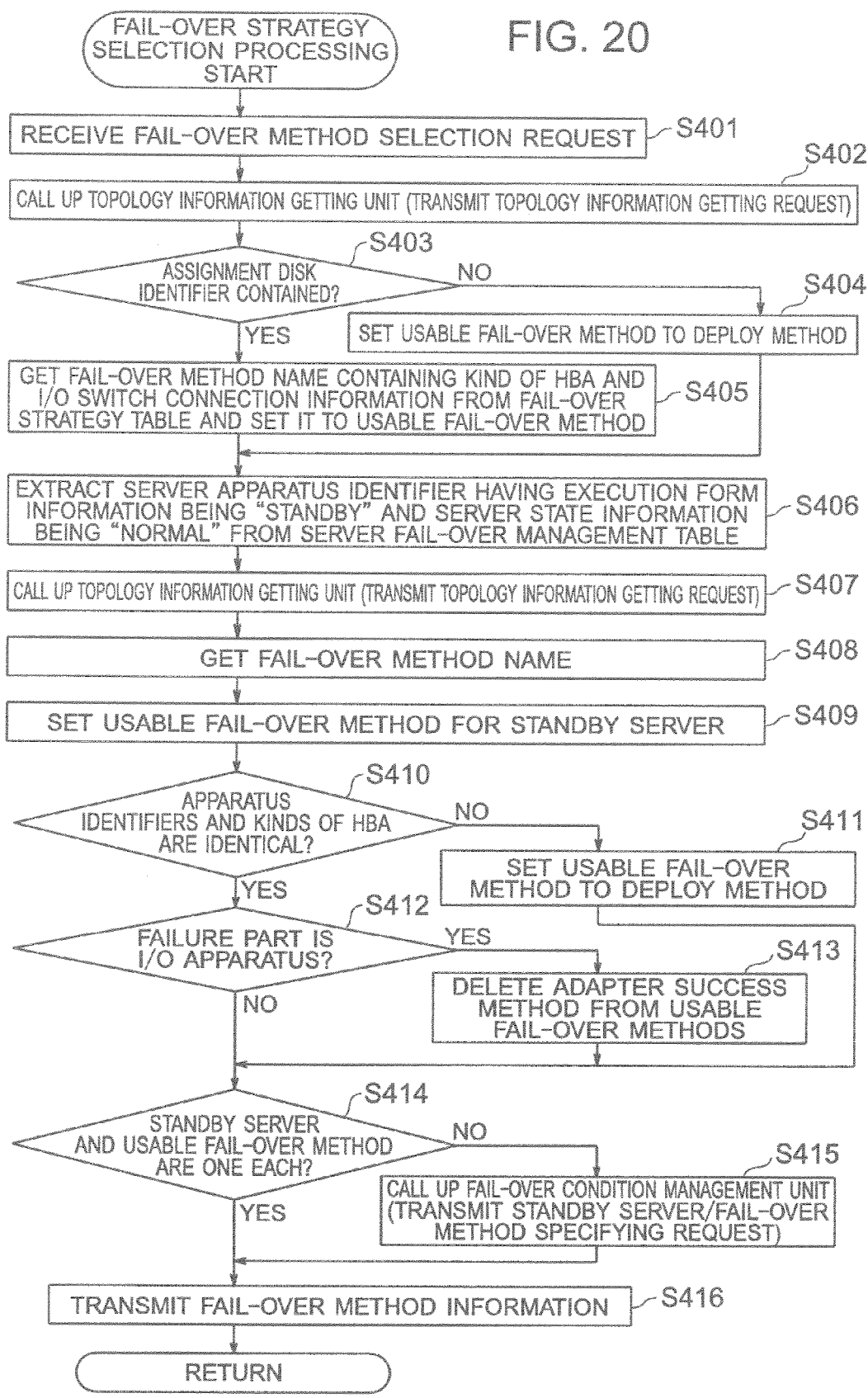
FIG. 20 is a flow chart showing operation procedure of fail-over strategy selection processing by a fail-over strategy selection unit according to the embodiment of the present invention.

FIG. 20 is a flow chart showing operation procedure of the fail-over strategy selection processing by the fail-over strategy selection unit according to the embodiment.

First, when the fail-over strategy selection unit 116 receives the fail-over method selection request transmitted by the server fail-over unit 113 in step S105 of FIG. 17 (step S401), the fail-over strategy selection unit 116 transmits the topology information getting request for getting the topology information of the failed server apparatus 20 to the topology information getting unit 114 to thereby call up the topology information getting unit 114 (step S402). The topology information getting request contains the server apparatus identifier of the failed server apparatus 20. The processing of step S402 corresponds to the processing of step S106 of FIG. 17.

The fail-over strategy selection unit 116 receives the topology information transmitted from the topology information getting unit 114 in step S107 of FIG. 17 (not shown in FIG.

20). The topology information contains the server assignment apparatus identifier (corresponding to column 904 of FIG. 9) of the failed server apparatus 20, the I/O switch connection information (corresponding to column 906 of FIG. 9), the fund of HBA (corresponding to column 1502 of FIG. 15) of HBA 40 connected to the failed server apparatus 20, the assignment disk identifier (corresponding to column 1504 of FIG. 15), the I/O switch identifier (corresponding to column 1301 of FIG. 13) connected to the HBA 40, the I/O port number (corresponding to column 1302 of FIG. 13), the apparatus identifier (corresponding to column 1404 of FIG. 14) of the storage apparatus 30 and the like.

Next, the fail-over strategy selection unit 116 judges whether the assignment disk identifier contained in the topology information is contained in the HBA management table 127 (FIG. 15) or not (step S403).

As a result of step S403, when the assignment disk identifier is not contained in the HBA management table 127 (step S403→No), the fail-over strategy selection unit 116 sets the fail-over method (the first fail-over method described in Claims) usable by the failed server apparatus 20 to the deploy method (step S404) and then shifts the processing to step S406. The case where the assignment disk identifier is not contained in the HBA management table 127 corresponds to the case where the column 1504 of the HBA management table 127 (FIG. 15) is "-" and the disk of the storage apparatus 30 is not connected to the failed server apparatus 20.

As a result of step S403, when the assignment disk identifier is contained in the HBA management table 127 (step S403→Yes), the fail-over strategy-selection unit 116 gets the fail-over method name satisfying conditions of the kind of HBA and the I/O switch connection information contained in the topology information from the fail-over strategy table 123 and sets it as the usable fail-over method (first fail-over method) of the failed server apparatus 20 (step S405). At this time, the usable fail-over methods to be set may be plural in number.

Next, the fail-over strategy selection unit 116 extracts all of server apparatus identifiers (that is, identifiers of the server apparatuses 20 for candidates of the standby servers) having the execution form information (column 1002) being "standby" and the server state information (column 1004) being "normal" in the server fail-over management table 122 (FIG. 10) from column 1001 of the server fail-over management table 122 (step S406). When a plurality of server apparatus identifiers (server apparatus identifiers for candidates of standby servers) are extracted in step S406, the fail-over strategy selection unit 116 executes the processing of the following steps S407 to S413 repeatedly by the number of the extracted server apparatus identifiers.

Next, the fail-over strategy selection unit 116 transmits the topology information getting request for getting the topology information related to the standby servers (candidates) extracted in step S406 to the topology information getting unit 114 to call up the topology information getting unit 114 (step S407). The topology information getting request contains the server apparatus identifier to be processed, of the server apparatus identifiers of the standby servers (candidates) extracted in step S406. The processing of step S407 corresponds to the processing of step S106 of FIG. 17. The processing of steps S106 and S107 of FIG. 17 is performed repeatedly by the number of the failed server apparatus 20 and the standby servers extracted in step S406.

The fail-over strategy selection unit 116 receives the topology information transmitted from the topology information getting unit 114 in step S107 of FIG. 17 (not shown in FIG. 20). The topology information contains the server assignment apparatus identifier (corresponding to column 904 of FIG. 9) of the standby server, the I/O switch connection information (corresponding to column 906 of FIG. 9), the kind of HBA (corresponding to column 1502 of FIG. 15) of HBA 40 connected to the standby server, the assignment disk identifier (corresponding to column 1504 of FIG. 15), the I/O switch identifier (corresponding to column 1301 of FIG. 13) connected to the HBA 40, the I/O port number (corresponding to column 1302 of FIG. 13), the apparatus identifier (corresponding to column 1404 of FIG. 14) of the storage apparatus 30 and the like. When the standby server is connected to the I/O switch apparatus 60, the topology information further contains the apparatus identifier (corresponding to column 1304 of FIG. 13) of the HBA 40 which is not connected to any server apparatus 20, of the HBAs 40 connected to the standby server and the I/O switch apparatus 60.

Next, the fail-over strategy selection unit 116 gets the fail-over method name (second fail-over method) satisfying conditions of the kind of HBA and the I/O switch connection information contained in the received topology information from the column 1101 of the fail-over strategy table 123 (step S408).

Next, the fail-over strategy selection unit 116 sets the fail-over method name (third fail-over method) applicable to both of the fail-over method name (second fail-over method) gotten in step S408 and the fail-over method name (first fail-over method) gotten in step S405 as the usable fail-over method for the standby server (step S409). At thus point of time, when the usable fail-over method is "0", the fail-over strategy selection unit 16 may display an error in a display unit of the management server 10 not shown.

Next, the fail-over strategy selection unit 116 compares the apparatus identifier of the storage apparatus 30 connected to the failed server apparatus 20, contained in the topology information gotten after step S402 with the apparatus identifier of the storage apparatus 30 connected to the standby server, contained in the topology information gotten after step S407.

The fail-over strategy selection unit 116 judges whether the apparatus identifier of the storage apparatus 30 connected to the failed server apparatus 20 is identical with that connected to the standby server and the kind of HBA of the HBA 40 connected to the failed server apparatus 20, contained in the topology information is identical with that connected to the standby server on the basis of the result of the comparison (step S410). That is, in step S410, the fail-over method selection unit 116 judges whether the storage apparatus 30 connected to the failed server apparatus is identical with that connected to the standby server and the HBA 40 in the failed server apparatus 30 is identical with that in the standby server.

As a result of step S410, when the apparatus identifiers of the storage apparatuses 30 are different or the kinds of HBA of the HBA 40 connected are different (step S410→No), the fail-over strategy selection unit 116 sets (changes) the usable fail-over method for the standby server to the deploy method (step S411) and shifts the processing to step S414. At this time, when the fail-over method 1101 except the deploy method is set in step S409, the fail-over strategy selection unit 116 forcedly sets the fail-over method to the deploy method.

As a result of step S410, when the apparatus identifiers of the storage apparatuses 30 are identical and the kinds of HBA are identical (step S410→Yes), the fail-over strategy selection unit 116 judges whether the failure part is the I/O apparatus such as HBA 40 or not (step S412). Information related to the failure part may be contained in the failure occurrence notification received by the failure detection unit.

As a result of step S412, when the failure part is the I/O apparatus such as HBA 40 (step S412→Yes), the fail-over strategy selection unit 116 deletes the adapter succession method from the usable fail-over methods for the standby server (step S413) and shifts the processing to step S414. Furthermore, when the adapter succession method is not contained in the candidates of the usable fail-over methods for the standby server, the fail-over strategy selection unit 116 does not perform the processing of step S412.

As a result of step S412, when the failure part is not the I/O apparatus such as HBA 40 (step S412→No), the fail-over strategy selection unit 116 judges whether the standby server extracted in step S406 and the usable fail-over method set in step S409 are one each (step S414).

As a result of step S414, when at least one of the standby server and the usable fail-over method is plural in number (step S414→No), the fail-over strategy selection unit 116 transmits the standby server/fail-over method specifying request to the fail-over condition management unit 112 to call up the fail-over condition management unit 112 (step S415) and then shifts the processing to step S416. The processing of step S415 corresponds to the processing of step S108 of FIG. 17. The standby server/fail-over method specifying request contains the server apparatus identifier of the failed server apparatus 20 and furthermore contains the server apparatus identifiers of all of the standby servers extracted in step S406 and the usable fail-over method for each standby server set in step S409 as pair information. The processing of step S414 is to narrow down the plural fail-over methods and standby servers to one each.

As a result of step S413, when the standby server and the usable fail-over method are one each (step S414→Yes) or when the fail-over strategy selection unit 116 receives the fail-over method information containing the server apparatus identifier of the standby server and the fail-over method name specified by the fail-over condition management unit 112 in step S109 of FIG. 17, the fail-over strategy selection unit 116 transmits the fail-over method information containing the server identifier of the standby server and the fail-over method name to the server fail-over unit 113 (step S416). The processing of step S416 corresponds to the processing of step S110 of FIG. 17.

According to the above processing, the standby server for performing fail-over and the fail-over method 1101 can be changed dynamically in accordance with the topology information of the failed server apparatus 20 and the standby server, the failure part and the like.

(Topology Information Getting Processing)

Figure 21:
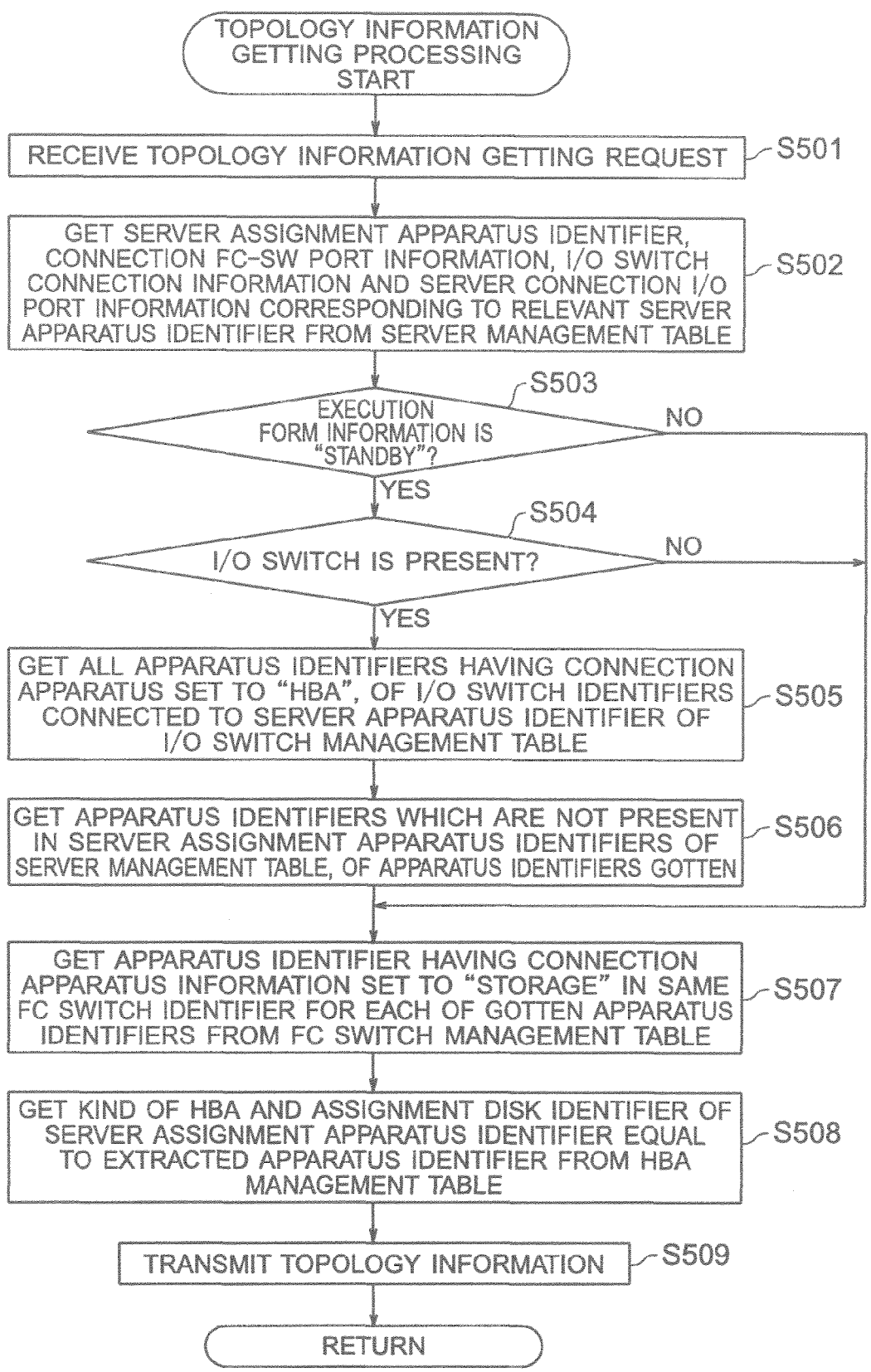
FIG. 21 is a flow chart showing operation procedure of topology information getting processing by a topology information getting unit according to the embodiment of the present invention.

FIG. 21 is a flow chart showing operation procedure of the topology information getting processing by the topology information getting unit according to the embodiment. As described above, the processing of FIG. 21 is performed repeatedly by the number of the failed server apparatus 20 and the candidates of the standby servers extracted in step S406 of FIG. 20.

First, the topology information getting unit 114 receives the topology information getting request transmitted from the fail-over strategy selection unit 116 in step S106 of FIG. 17 (step S501). The topology information getting request contains the server apparatus identifiers of the failed server apparatus 20 or the standby server extracted in step S406 of FIG. 20.

Next, the topology information getting unit 114 uses the server apparatus identifier contained in the topology information getting request as a key to get the server assignment apparatus identifier (column 904), the connection FC-SW port information (column 905), the I/O switch connection information (column 906) and the server connection I/O port information (column 907) corresponding to the relevant server apparatus identifier from the server management table 121 (FIG. 9) (step S502).

Next, the topology information getting unit 114 searches the server fail-over management table 122 (FIG. 10) using the server apparatus identifier contained in the topology information getting request as a key and judges whether the relevant execution form information (column 1002) is "standby" or not (step S503).

As a result of step S503, when the execution form information is not "standby" (step S503→No), the topology information getting unit 114 shifts the processing to step S507.

As a result of step S503, when the execution form information is "standby" (step S503→Yes), the topology information getting unit 114 judges whether the I/O switch connection information gotten in step S502 is "present" (I/O switch is present) or not (step S504).

As a result of step S504, when it is not "present" (in case of "absent": step S504→No), the topology information getting unit 114 shifts the processing to step S507.

As a result of step S504, when it is "present" (step S504→Yes), the topology information getting unit 114 gets all of the apparatus identifiers having the connection apparatus set to "HBA." from among the I/O switch identifiers connected to the server apparatus identifier of the I/O switch management table 125 (step S505). More specifically, in step S505, the topology information getting unit 114 uses the I/O port identifier contained in the server connection I/O port information gotten in step S502 as a key to search the I/O switch management table 125 (FIG. 13) and gets all of the apparatus identifiers (column 1304) having the connection apparatus information (column 1303) set to "HBA".

Next, the topology information getting unit 114 gets the apparatus identifiers which are not present in the server assignment apparatus identifiers of the server management table 121 from among the apparatus identifiers gotten in step S505 (step S506). More specifically, the topology information getting unit 114 compares the apparatus identifiers gotten in step S505 with the server assignment apparatus identifiers (column 904) of the server management table 121 (FIG. 10) to extract the apparatus identifiers which are net present in column 904. Thus, the HBA 40 which is not related to any server apparatus 20, of the HBA 40 connected to the standby server and the I/O switch apparatus 60 can be specified.

Then, the topology information getting unit 114 gets the apparatus identifier having the connection apparatus information set to "storage" in the same FC switch identifiers for each of the gotten apparatus identifiers from the FC switch management table 126 (step S507). More specifically, the topology information getting unit 114 first refers to the column 1404 (apparatus identifier) of the FC switch management table 126 (FIG. 14). The topology information getting unit 114 gets from the column 1401 the server assignment apparatus identifier gotten in step S502 and the FC switch identifier corresponding to the apparatus identifier extracted in step S506 in the column 1404. Next, the topology information getting unit 114 gets from the column 1404 the apparatus identifiers having the connection apparatus information (column 1403) set to "storage" in the FC switch identifier.

Moreover, the topology information getting unit 114 gets from the HBA management table 127 the assignment disk identifier and the kind of HBA of the server assignment apparatus identifier equal to the extracted apparatus identifier (step S508). More specifically, the topology information getting unit 114 refers to the server assignment apparatus identifier (column 1501) of the HBA management table 127 (FIG. 15)

and gets the kind of HBA (column 1502) and the assignment disk identifier (column 1504) corresponding to the server assignment apparatus identifier gotten in step S502 and the apparatus identifier extracted in step S506. When there is no relevant assignment disk identifier (when the column 1504 of FIG. 15 is "-"), the topology information getting unit 114 gets information such as "NULL".

Moreover, the topology information getting unit 114 refers to the I/O switch management table 125 (FIG. 13) using the I/O switch identifier contained in the server connection I/O port information gotten in step S502 as a key to get the relevant I/O port number (column 1302).

Then, the topology information getting unit 114 transmits the topology information containing the gotten information to the fail-over strategy selection unit 116 (step S509). As described above, the topology information contains the server assignment apparatus identifier (corresponding to column 904 of FIG. 9), the I/O switch connection information (corresponding to column 906 of FIG. 9), the kind of HBA of the HBA 40 connected to the standby server (corresponding to column 1502 of FIG. 15), the assignment disk identifier (corresponding to column 1504 of FIG. 15), the I/O switch identifier (corresponding to column 1301 of FIG. 13) connected to HBA 40, the I/O port number (corresponding to column 1302 of FIG. 13), the apparatus identifier of the storage apparatus 30 (corresponding to column 1404 of FIG. 14) and the like. In addition to the above information, when the standby server is connected to the I/O switch apparatus 60, the topology information contains the apparatus identifier (corresponding to column 1304 of FIG. 13) of HBA 40 which is not connected to any server apparatus 20, of HBAs 40 connected to the standby server and the I/O switch apparatus 60.

In the embodiment, the topology information is previously stored in the FC switch management table 126 and the HBA management table 127 of the memory unit 12, although the present invention is not limited thereto and when occurrence of failure in the server apparatus is detected, the topology information getting unit 114 may transmit the topology information getting request to BMC of the server apparatus 20 or agent to get necessary topology information.

According to the above processing flow, information such as HBA 40 connected to the failed server apparatus 20, the storage apparatus 30 connected to the standby server, the boot disk and the I/O switch apparatus 60 but not related to the server apparatus 20 can be gotten.

(Fail-Over Condition Management Processing)

Figure 22:
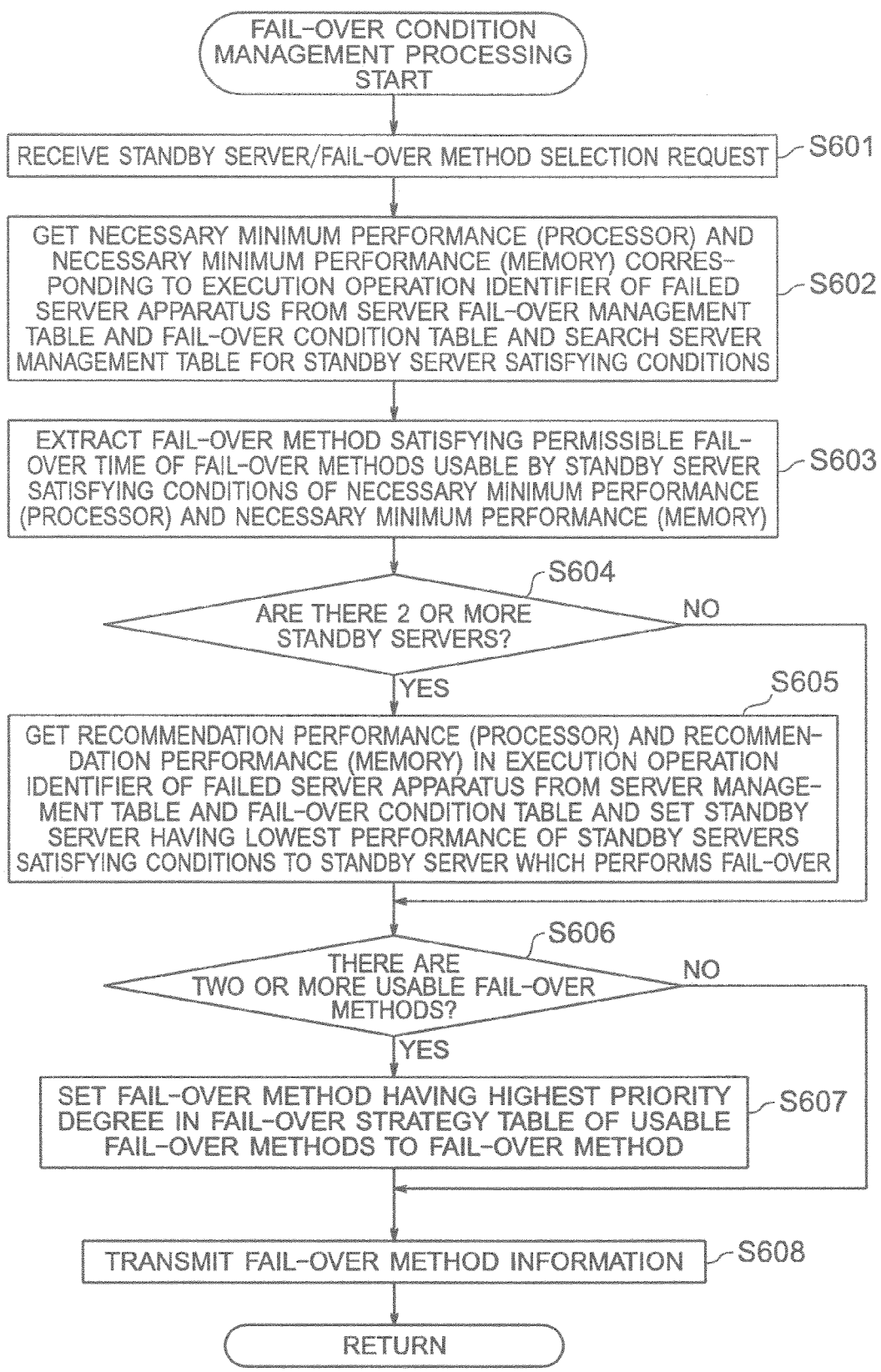
FIG. 22 is a flow chart showing operation procedure of fail-over condition management processing by a fail-over condition management unit according to the embodiment of the present invention.

FIG. 22 is a flow chart showing operation procedure of the fail-over condition management processing by the fail-over condition management unit according to the embodiment. As described above, the processing of FIG. 22 is performed when plural fail-over methods and standby servers are selected.

First, the fail-over condition management unit 112 receives the standby server/fail-over method selection request from the fail-over strategy selection unit 116 in step S108 of FIG. 17 (step S601). The standby server/fail-over method selection request contains the server identifier of the failed server apparatus 20 and further contains pair information of the server identifier of the standby server and the fail-over method name selected by the processing of FIG. 20.

Next, the fail-over condition management unit 112 gets the necessary minimum performance (processor) and the necessary minimum performance (memory) corresponding the execution operation identifier of the failed server apparatus from, the server fail-over management table 122 and the fail-over condition table 124 and searches the server management table 121 for the standby server satisfying the conditions (step S602). More specifically, the fail-over condition management unit 112 first uses the server identifier of the failed server apparatus 20 contained in the standby server/fail-over method selection request as a key to get the execution operation identifier (column 1002) of the failed server apparatus 20 from the server fail-over management table 122 (FIG. 10). Further, the fail-over condition management unit 112 uses the gotten execution operation identifier as a key to get the necessary minimum performance (processor) 1202 and the necessary minimum performance (memory) 1203 from the fail-over condition table 124 (FIG. 12). Then, the fail-over condition management unit 112 refers to the processor configuration information (column 902) and the memory capacity (column 903) of the server management table 121 (FIG. 9) using the server-apparatus identifier of the standby server contained in the standby server/fail-over method selection request as a key and extracts the standby server having the processor configuration information (column 902) and the memory capacity (column 903) better than the gotten necessary minimum performance (processor) (column 1202) and the necessary minimum performance (memory) (column 1203), from among the standby servers selected in step S409 of FIG. 20. Further, at this time, when the number of the standby server is 0, an error may be displayed in an display unit not shown of the management server 10 and the processing may be interrupted.

Next, the fail-over condition management unit 112 extracts the fail-over method satisfying the permissible fail-over time, of the fail-over methods usable by the standby server satisfying the conditions of the necessary minimum performance (processor) and the necessary minimum performance (memory) gotten in step S602 (step S603). More specifically, the fail-over condition management unit 112 searches the fail-over condition table 124 (FIG. 12) using the execution operation identifier gotten in step S602 as a key to extract the corresponding permissible fail-over time (column 1206). Furthermore, the fail-over condition management unit 112 refers to the fail-over strategy table (FIG. 11) using the name of the fail-over method usable by the standby server extracted in step S602 as a key and gets the necessary fail-over time (column 1102) for each name of the fail-over methods usable by the standby server extracted in step S602. The fail-over condition management unit 112 deletes the fail-over method name having the necessary fail-over time longer than the gotten permissible fail-over time from the usable fail-over methods. Thus, the fail-over condition management unit 112 extracts the fail-over method satisfying the permissible fail-over time, of the fail-over methods usable by the standby server satisfying the conditions of step S602. Furthermore, at this time, when the number of the standby server is 0, an error may be displayed in an display unit not shown of the management server 10 and the processing may be interrupted.

Next, the fail-over condition management unit 112 judges whether there are two or more standby servers for candidates at this time (S604).

As a result of step S604, when there are not 2 or more standby servers for the candidates, that is, when there is one standby server for the candidate (step S604→No), the fail-over condition management unit 112 shifts the processing to step S606.

As a result of step S604, when there are 2 or more standby servers for the candidates (step S604→Yes), the fail-over condition management unit 112 gets the recommendation performance (processor) and the recommendation performance (memory) in the execution operation identifier of the failed server apparatus 20 from the server management table 121 (FIG. 9) and the fail-over condition table 124 (FIG. 12) and sets the standby server having the lowest performance, of the standby servers satisfying the conditions to the standby server which performs fail-over (step S605). More specifically, the fail-over condition management unit 112 uses the execution operation identifier gotten in step S602 as a key to get the relevant recommendation performance (processor) (column 1203) and recommendation performance (memory) (column 1204) from the fail-over condition table 124 (FIG. 12). Thereafter, the fail-over condition management unit 112 refers to the server management table 121 (FIG. 9) using the server apparatus identifier of the standby server as a key to extract the standby server having the processor configuration information (column 902) and the memory capacity (column 903) better than the gotten recommendation performance (processor) and recommendation performance (memory). As a result, when there are plural standby servers, the fail-over condition management unit 112 sets the standby server having the lowest performance within the performance better than that required by the operation, of the plural standby servers to the standby server for fail-over. The reason that the server apparatus 20 having the lowest performance is set as the standby server is that the case where the server apparatus 20 requiring higher performance fails is considered to leave the standby server having as higher performance as possible.

Next, the fail-over condition management unit 112 judges whether there are two or more usable fail-over methods for the standby server at this time or not (step S606).

When there is the usable fail-over method less than 2 in number, that is, when there is one usable fail-over method (step S606→No), the fail-over condition management unit 112 shifts the processing to step S608.

When there are 2 or more usable fail-over methods (step S606→Yes), the fail-over condition management unit 112 sets the fail-over method having the highest priority degree in the fail-over strategy-table 123, of the usable fail-over methods to the fail-over method (step S607). More specifically, the fail-over condition management unit 112 refers to the priority degree (column 1105) of the fail-over strategy table 123 (FIG. 11) using the relevant fail-over method name as a key and sets the fail-over method having the highest priority degree, of the plural usable fail-over methods to the final fail-over method. As described above, in the priority degrees of the example shown in FIG. 11, "1" is highest and 4 is lowest. For example, when the usable fail-over methods are "deploy method" and "mapping change method", the "mapping change method" has the priority degree (the value of the priority degree is small) higher than that of the "deploy method" and accordingly the "mapping change method" is set as the final fail-over method.

The fail-over condition management unit 112 transmits the fail-over method information containing the server identifier of the standby server specified finally and the usable fail-over method as pair information to the fail-over strategy selection unit 116 (step S608). The processing of step S608 corresponds to the processing of step S109 in FIG. 17.

According to the above processing, even when the fail-over strategy selection unit 116 selects plural standby servers and usable fail-over methods, one standby server and one usable fail-over method can be specified. Furthermore, since the standby server and the fail-over method can be selected along the conditions of the operation being executed, the availability of the system can be enhanced.

(Deploy Execution Processing)

Figure 23:
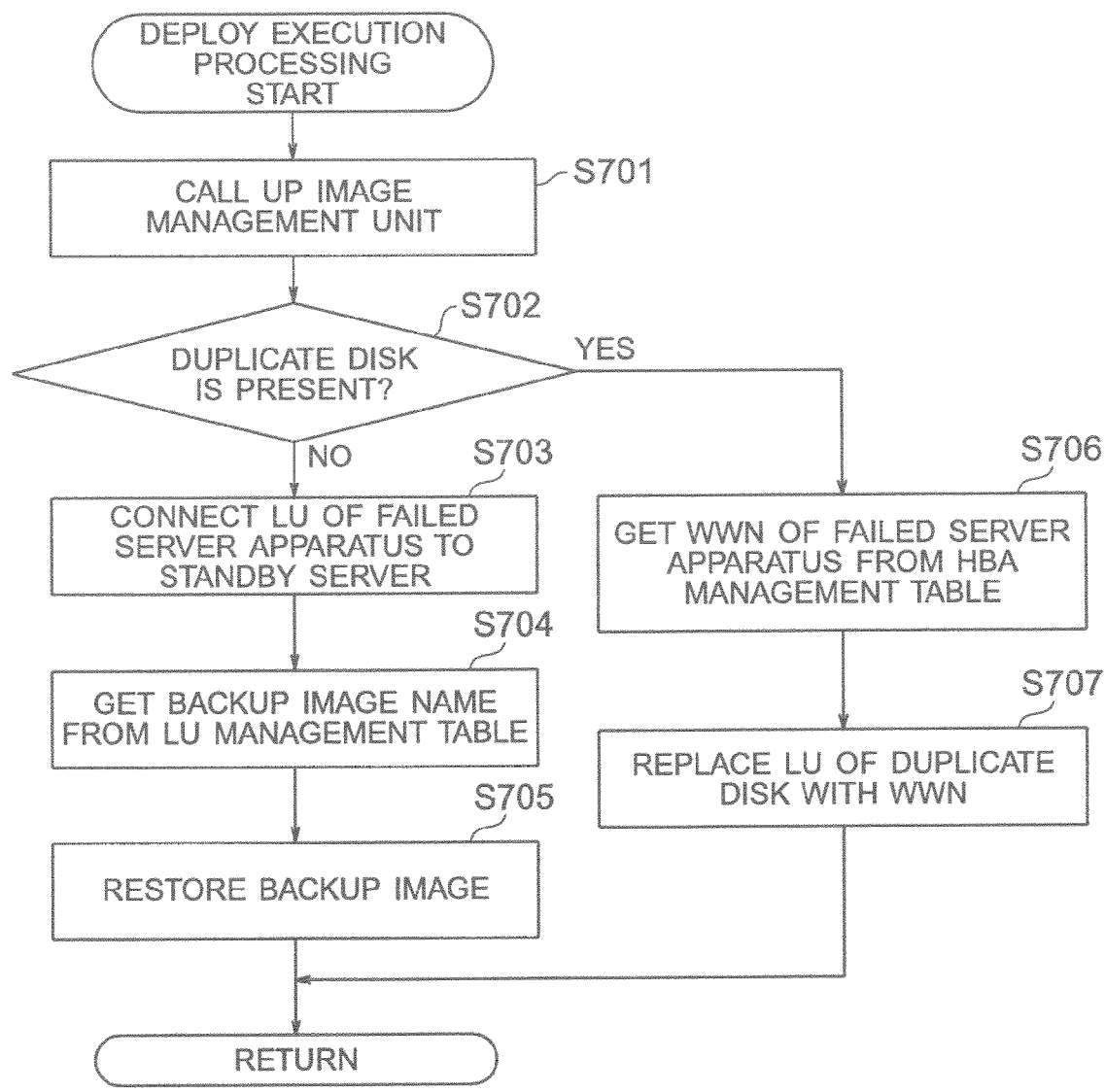
FIG. 23 is a flow chart showing operation procedure of deploy execution processing by a deploy execution unit according to the embodiment of the present invention.
Figure 24:
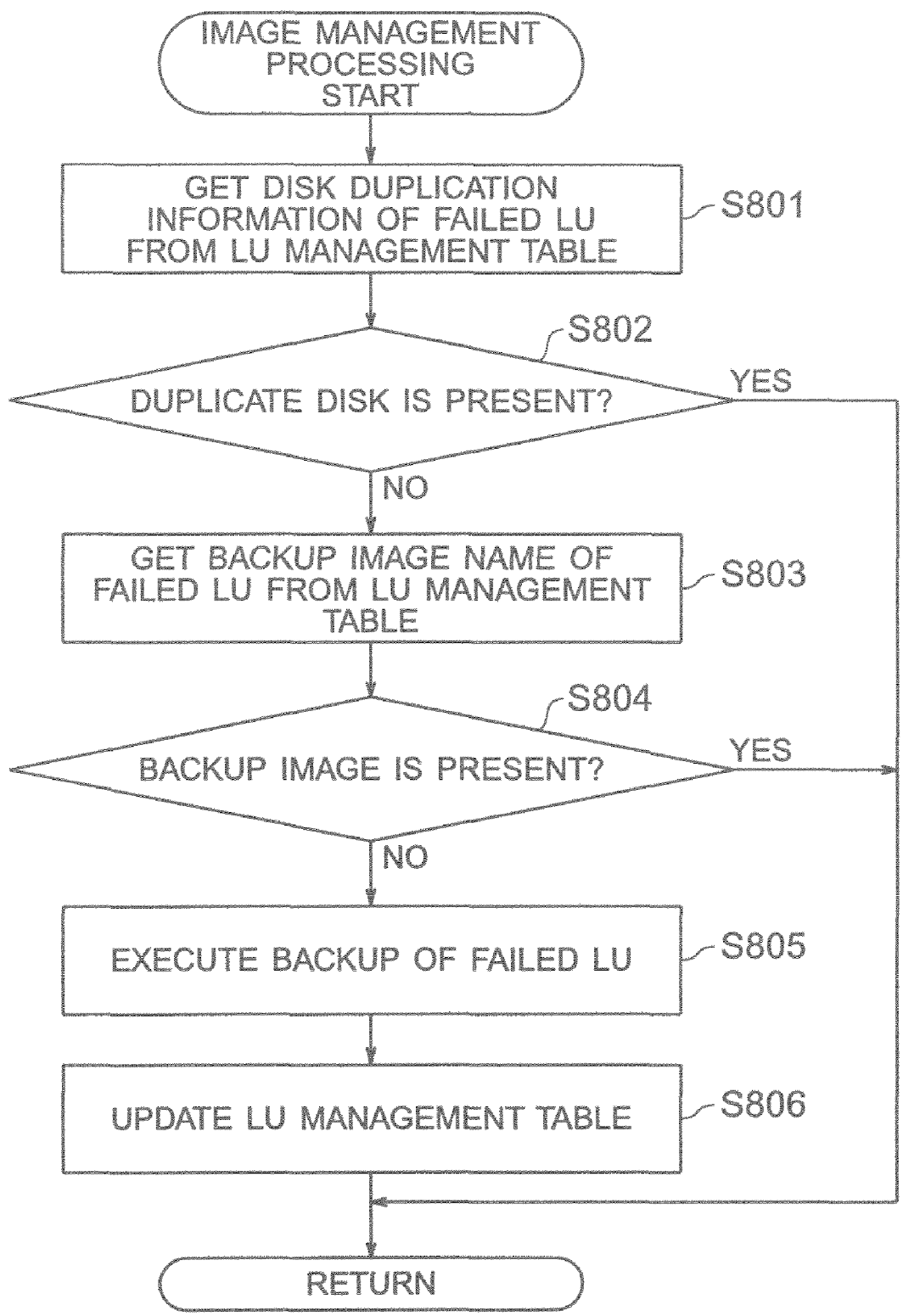
FIG. 24 is a flow chart showing operation procedure of image management processing by an image management unit according to the embodiment of the present invention.

Referring now to FIGS. 23 and 24, the processing in step S111 (fail-over execution processing) of FIG. 17 is described. FIGS. 23 and 24 show the processing performed when the deploy method is set as the fail-over method and since the processing performed when another fail-over method is set is generally known, detailed description thereof is omitted.

FIG. 23 is a flow chart showing operation procedure of the deploy execution processing by the deploy execution unit according to the embodiment.

The deploy execution unit 131 called up in step S307 of FIG. 19 first performs the calling processing of the image management unit 132 (step S701) and the image management unit 132 performs image management processing described later in FIG. 24. When backup of LU related to the failed server apparatus 20 is not prepared, the image management unit 132 backs up the relevant LU.

Next, the deploy execution unit 131 refers to the duplicate disk information (column 1605) in the LU management table 123 (FIG. 16) using the LU identifier related to the failed server apparatus 20 as a key and judges whether the duplicate disk 32 is present or not (step S702). The LU identifier is gotten by the following procedure. First, the deploy execution unit 131 receives the server apparatus identifier of the failed server apparatus 20 from the server fail-over unit 113. Then, the deploy execution unit 131 refers to the server management table 121 (FIG. 9) using the received server apparatus identifier as a key and gets the relevant server assignment apparatus identifier from column 904. Moreover, the deploy execution unit 131 refers to the HBA management table 127 (FIG. 15) using the gotten server assignment apparatus identifier as a key and gets the relevant assignment disk identifier as the LU identifier related to the failed server apparatus 20 from the column 1504. The case where there is no duplicate disk 32 is caused when the image management unit 132 selects "No" in step S302 and "Yes" in step S804 in the processing of FIG. 24 described later.

As a result of step S702, when the duplicate disk 32 is not present (step S702→No), the deploy execution unit 131 connects LU of the failed server apparatus to the standby server (step S703). The processing of step S703 is performed by the following procedure, for example. First, the deploy management unit 13 refers to the HBA management table 127 (FIG. 15) to relate the assignment disk identifier of the failed server apparatus 20 received from the topology information getting unit 114 to the HBA 40 corresponding to the server assignment apparatus identifier (HBA identifier) of the standby server received from the topology information getting unit 114.

The deploy execution unit 131 uses the LU identifier related to the failed server apparatus 20, gotten in step S702 as a key to get the backup image name (column 1604) from the LU management table 128 (FIG. 16) and get the backup image corresponding to the backup image name.

Then, the deploy execution unit 131 restores the gotten backup image (step S705). More specifically, the deploy execution unit 131 receives the server apparatus identifier of the standby server from the server fail-over unit 113 and performs the same processing as in step S702 using the server apparatus identifier as a key to get the LU identifier related to the standby server. The deploy execution unit 131 restores the gotten backup image to the LU (that is, boot disk 31 connected to the standby server) corresponding to the gotten LU identifier.

As a result of step S702, when the duplicate disks 32 is present (step S702→Yes), the deploy execution unit 131 gets WWN (column 1503) corresponding to the server assignment apparatus identifier in the failed server apparatus 20 from the HBA management table 127 (FIG. 15) (step S706). The server assignment apparatus identifier in the failed server apparatus is information received from the topology information getting unit 114.

Next, the deploy execution unit 131 gets the LU identifier of the duplicate disk 32 in the duplicate disk information (column 1605 of FIG. 16) referred in step S702. The deploy execution unit 131 searches the column 1601 of the LU management table 128 (FIG. 16) using the LU identifier of the gotten duplicate disk 32 as a key and gets the relevant port number (column 1602) and domain ID as the port number and the domain ID of the duplicate disk 32. The deploy execution unit 131 relates the LU connected to the gotten port number and domain ID of the duplicate disk 32 to the WWN gotten in step S706 to thereby replace the LU of the duplicate disk 32 with the WWN (step S707).

The processing in steps S706 and S707 is processing for lightening processing burden without performing deploy when there are plural disks 32.

According to the above processing, data in the boot disk 31 of the failed server apparatus 20 can be handed over to the standby server by the deploy method.

(Image Management Processing)

FIG. 24 is a flow chart showing operation procedure of the image management processing by the image management unit according to the embodiment.

The image management unit 132 called up by the deploy execution unit 131 in step S701 of FIG. 23 gets the disk duplication information of the failed LU from the LU management table 128 (step S801). More specifically, the image management unit 132 gets the duplicate disk information (column 1605) from the LU management table 128 (FIG. 16) using the LU identifier related to the failed server apparatus 20 as a key. The procedure of getting the LU identifier related to the server apparatus 20 is the same as that of step S702 of FIG. 23. At this time, when the relevant duplicate disk information is not contained in the LU management table 128, the image management unit 132 gets information such as "NULL".

Next, the image management unit 132 judges whether the duplicate disk information can be gotten in step S801 or not to thereby judge whether the duplicate disk 32 is present or not (step S802).

As result of step S802, when the duplicate disk 32 is present (step S802→Yes), the processing is returned to the processing of FIG. 23.

As a result of step S802, when the duplicate disk 32 is not present (step S802→No), that is, when information such as "NULL" is gotten in step S801, the image management unit 132 gets the backup image name of the failed LU from the LU management table 128 (step S803). More specifically, the image management unit 132 uses the LU identifier related to the failed server apparatus 20, gotten in step S801 as a key to get the relevant backup image name (column 1604) from the LU management table 128. At this time, when there is no relevant backup image name in the LU management table 128, the image management unit 132 gets information such as "NULL".

Next, the image management unit 123 judges whether the backup image name can be gotten in step S803 or not to thereby judge whether the backup image is present or not (step S804).

As a result of step S804, when the backup image is present (step S804→Yes), the processing is returned to the processing of FIG. 23.

As a result of step S804, when the backup image is not present (step S804→No), that is, when information such as "NULL" is gotten in step S803, the image management unit 132 executes backup of LU (failed LU) of the failed server apparatus 20 (step S805) and prepares the backup image.

The image management unit 132 updates the relevant backup image name (column 1604) of the LU management table 128 (FIG. 16) to the storage location of the backup image prepared in step S805 and the file name and the processing is returned to the processing of FIG. 23.

(Hardware Information Getting Processing)

FIG. 25 is a flow chart showing operation procedure of the hardware information getting processing by the hardware information getting unit according to the embodiment.

First, the hardware information getting unit 115 receives the management table update request transmitted from the failure detection unit 111 in step S101 of FIG. 17 (step S901).

Next, the hardware information getting unit 115 gets the server apparatus identifier of the server apparatus 20 started by start notification of the server apparatus 20 (step S902).

The hardware information getting unit 115 sends mini-OS to the server apparatus 20 corresponding to the server apparatus identifier gotten in step S902 and gets information of the apparatuses connected to the server apparatus 20 (step S903).

Then, the hardware information getting unit 115 updates the management tables containing the server management table 121, the I/O switch management table 125 and the HBA management table 127 on the basis of the apparatus information gotten in step S903 (step S904). For example, for the server management table 121 (FIG. 9), the hardware information getting unit 115 updates information including the processor configuration information (column 902), the memory capacity (column 903), the server assignment apparatus identifier (column 904), the I/O switch connection information (column 906) and the server connection I/O port information (column 907). For the I/O switch management table 125 (FIG. 13), the hardware information getting unit 115 updates information including the connection apparatus information (column 1303), the apparatus identifier (column 1304) and the apparatus state information (column 1305). Moreover, for the HBA management table 127 (FIG. 15), the hardware information getting unit 115 updates information including the kind of HBA (column 1502) and the WWN (column 1503). In addition, the hardware information getting unit 115 may update the server fail-over management table 122 (FIG. 10), the FC switch management table 126 (FIG. 14) and the LU management table 128 (FIG. 16).

When update of the management tables is completed, the hardware information getting unit 115 transmits management table update end notification to the failure detection unit 111 as update response (step S905). The processing of steps S904 and S905 corresponds to that of step S102 of FIG. 17.

According the above processing, the information (management tables) related to the apparatuses connected to the server apparatuses 20 can be updated.

In the embodiment, the fail-over method is selected on the basis of the information (topology information: apparatus information in Claims) related to the apparatuses such as HBA 40, although the present invention is not limited thereto and information as to whether the failure part is OS or not may be contained in the judgment standard of the fail-over method as the apparatus information as shown in FIG. 8.

According to the embodiment, the fail-over method can be changed dynamically in consideration of the connection state of fiber channel, HBA 40 of fiber channel, fiber channel switch 50 and external RAID apparatus (storage apparatus 30) provided in the computer system 1 to share the standby server among the active servers having different hardware configuration and reduce an initial introduction cost.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A server change-over method in a management server to manage accesses of a plurality of server apparatuses and a memory device in a storage apparatus, wherein
the plurality of server apparatuses include an active server and one or more standby servers, and
the method comprises the following steps performed by the management server:
storing in a memory unit change-over strategy information associating apparatus information related to the server apparatuses with change-over methods defining how to change over from one of the server apparatuses to another server apparatus in access of the memory device in the storage apparatus and priorities of the change-over methods;
getting from the memory unit first apparatus information which is the apparatus information for the active server previously stored in the memory unit;
getting at least one change-over method for the active server from the change-over strategy information in the memory unit on the basis of the gotten first apparatus information;
getting a second apparatus information for the one or more standby servers from the memory unit;
selecting one of the one or more standby servers which is enabled to execute a change-over method having a highest priority from among the gotten at least one change-over method based on the second apparatus information; and
changing over access of the storage apparatus from the active server to the selected standby server in accordance with the change-over method having the highest priority.

2. The server change-over method according to claim 1, wherein
the memory unit further stores therein change-over condition information containing permissible change-over time in operation being executed by each server apparatus and
the change-over strategy information further contains necessary change-over time for each change-over method,
the method further comprises the following steps performed by the management server:
getting, when plural change-over methods are gotten, the necessary change-over time for each of the change-over methods from the change-over strategy information and the permissible change-over time from the change-over condition information; and
excluding the change-over method having the gotten necessary change-over time longer than the gotten permissible change-over time from the change-over methods.

3. The server change-over method according to claim 1, wherein
there are a plurality of the standby servers,
the management server selects as the one standby server a standby server having a lowest performance from the plurality of the standby servers.

4. The server change-over method according to claim 1, wherein
there are a plurality of the standby servers,
the memory unit further stores therein change-over condition information containing performance necessary for operations executed by the server apparatuses and
the management server excludes from candidates at least one of the standby servers which does not satisfy performance necessary for operation executed by the active server, contained in the change-over condition information from among the plurality of the standby servers.

5. The server change-over method according to claim 1, wherein
the management server sets a deploy method as the change-over method when the memory device in the storage apparatus cannot access the active server.

6. The server change-over method according to claim 1, wherein
the management server sets a deploy method as the change-over method when the storage apparatus accessible to the active server is different from the storage apparatus accessible to the one standby server or when an HBA (host bus adapter) in the active server is different from an HBA in the one standby server.

7. The server change-over method according to claim 1, wherein
the management server deletes an adapter succession method from the change-over methods when a failure occurs in the active server.

8. The server change-over method according to claim 1, wherein
the apparatus information contains an identifier and a port number of an access apparatus in the server apparatuses.

9. A non-transitory computer-readable storage medium, comprising computer-readable program code embodied therein, that when executed, performs the server change-over method according to claim 1.

10. A management server to manage accesses of a plurality of server apparatuses and a memory device in a storage apparatus, wherein
the plurality of server apparatuses include an active server and one or more standby servers and
the management server comprises:
a memory unit in which change-over strategy information associating apparatus information related to the server apparatuses with change-over methods defining how to change over from one of the server apparatuses to another server apparatus in access of the memory device in the storage apparatus and priorities of the change-over methods;
an apparatus information getting unit configured to get from the memory unit first apparatus information which is the apparatus information for an active server previously stored in the memory unit and second apparatus information which is the apparatus information for one of the one or more standby servers;
a change-over selection method unit configured to get at least one change-over method for the active server from the change-over strategy information in the memory unit on the basis of the gotten first apparatus information and select one of the one or more standby servers which is enabled to execute a change-over method having a highest priority from among the gotten at least one change-over method based on the second apparatus information; and
a server changing-over unit configured to change over access of the storage apparatus from the active server to the selected standby server in accordance with the change-over method having the highest priority.

11. The management server according to claim 10, wherein
the memory unit stores therein change-over condition information containing permissible change-over time in operation being executed by each server apparatus and the change-over strategy information further contains necessary change-over time for each change-over method, the management server further comprising a change-over condition management unit configured to get, when plural change-over methods are gotten, the necessary change-over time for each of the change-over methods from the change-over strategy information and the permissible change-over time from the change-over condition information and exclude the change-over method having the gotten necessary change-over time longer than the gotten permissible change-over time from the change-over methods.

12. The management server according to claim 10, wherein there are a plurality of the standby servers, and further comprising a change-over condition management unit configured to select as the one standby server a standby server having a lowest performance from the plurality of the standby servers.

13. The management server according to claim 10, wherein there are a plurality of the standby servers, the memory unit further stores therein change-over condition information containing performance necessary for operations executed by the server apparatuses and the management server further comprising a change-over condition management unit configured to exclude from candidates at least one of the standby servers which does not satisfy performance necessary for operation executed by the active server, contained in the change-over condition information from among the plurality of the standby servers.

14. The management server according to claim 10, wherein the change-over method selection unit further comprises means to set a deploy method as the change-over method when the memory device in the storage apparatus cannot access the active server.

15. The management server according to claim 10, wherein the change-over method selection unit further comprises means to set a deploy method as the change-over method when the storage apparatus accessible to the active server is different from the storage apparatus accessible to the one standby server or when an HBA (host bus adapter) in the active server is different from an HBA in the one standby server.

16. The management server according to claim 10, wherein the change-over method selection unit further comprises means to delete an adapter succession method from the change-over methods when a failure occurs in the active server.

17. The management server according to claim 10, wherein the apparatus information in the memory unit contains an identifier and a port number of an access apparatus in the server apparatuses.

* * * * *